(12) United States Patent
Gandhi

(10) Patent No.: US 12,164,311 B1
(45) Date of Patent: Dec. 10, 2024

(54) SYSTEMS AND METHODS FOR APPLYING A MOVABLE NOTCH FILTER IN FLIGHT CONTROL OF EVTOL AIRCRAFT

(71) Applicant: Archer Aviation, Inc., San Jose, CA (US)

(72) Inventor: Nihar Gandhi, Pasadena, CA (US)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 18/622,756

(22) Filed: Mar. 29, 2024

Related U.S. Application Data

(60) Provisional application No. 63/512,784, filed on Jul. 10, 2023.

(51) Int. Cl.
| | | |
|---|---|---|
| *G05D 1/80* | (2024.01) | |
| *B64D 45/00* | (2006.01) | |
| *G05D 1/243* | (2024.01) | |
| *G05D 1/245* | (2024.01) | |
| *B64D 31/16* | (2024.01) | |

(Continued)

(52) U.S. Cl.
CPC .............. *G05D 1/80* (2024.01); *B64D 45/00* (2013.01); *G05D 1/243* (2024.01); *G05D 1/245* (2024.01); *B64D 31/16* (2024.01); *G05D 2109/24* (2024.01); *G05D 2111/52* (2024.01); *G05D 2111/56* (2024.01)

(58) Field of Classification Search
CPC .......... G05D 1/80; G05D 1/243; G05D 1/245; G05D 2109/24; G05D 2111/52; G05D 2111/56; B64D 45/00; B64D 31/16
See application file for complete search history.

(56) References Cited

U.S. PATENT DOCUMENTS

| 7,409,272 B2 | 8/2008 | Hanneman |
|---|---|---|
| 7,606,376 B2 | 10/2009 | Eid et al. |
| 8,514,103 B2 | 8/2013 | Maris |

(Continued)

OTHER PUBLICATIONS

H. Abdelnasser, M. Heggo, O. Pang, M. Kovac and J. A. McCann, "Multirotor Motion Enhancement using Propeller Speed Measurements," 2023 International Conference on Unmanned Aircraft Systems (ICUAS), Warsaw, Poland, 2023, pp. 401-406) (Year: 2023).*

(Continued)

*Primary Examiner* — Shon G Foley
(74) *Attorney, Agent, or Firm* — Finnegan, Henderson, Farabow, Garrett & Dunner, LLP

(57) ABSTRACT

An electrical system for an aircraft is disclosed, comprising: at least one processor configured to: receive first sensor data from at least one inertial sensor of the aircraft, wherein the first sensor data is indicative of a state of the aircraft, receive second sensor data from at least one of an airspeed sensor indicating an airspeed of the aircraft or a propeller speed sensor indicating a propeller speed of at least one propeller of the aircraft, and determine the state of the aircraft based on the first sensor data, wherein determining the state of the aircraft comprises filtering aircraft state measurements based on the second sensor data to lessen influence of propeller vibrations on at least one aircraft signal. The at least one processor is further configured to control the aircraft based on a pilot input command and the determined state of the aircraft.

72 Claims, 24 Drawing Sheets

(51) Int. Cl.
    *G05D 109/22*    (2024.01)
    *G05D 111/50*    (2024.01)

(56) References Cited

U.S. PATENT DOCUMENTS

| | | |
|---|---|---|
| 8,794,920 B2 | 8/2014 | Bacic et al. |
| 8,829,701 B2 | 9/2014 | Ficklscherer et al. |
| 10,362,392 B2 | 7/2019 | Alvord et al. |
| 10,453,473 B2 | 10/2019 | Whittaker et al. |
| 10,720,866 B2 | 7/2020 | Blackwelder et al. |
| 2021/0047995 A1* | 2/2021 | Maris .................. G01P 5/165 |

OTHER PUBLICATIONS

Mahmoud Hamandi et al. "Direct Acceleration Feedback Control of Quadrotor Aerial Vehicles", 2020 IEEE International Conference on Robotics and Automation (ICRA). May 31-Aug. 31, 2020. pp 5335-5341.

* cited by examiner

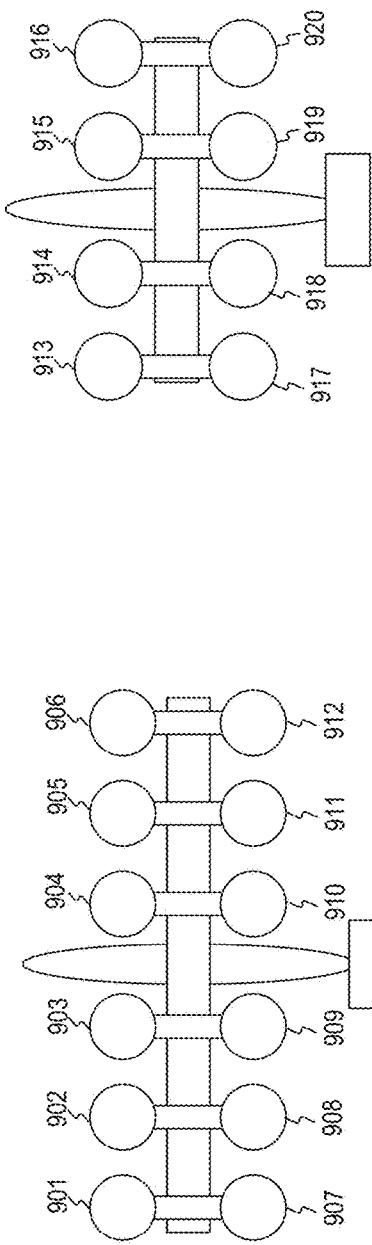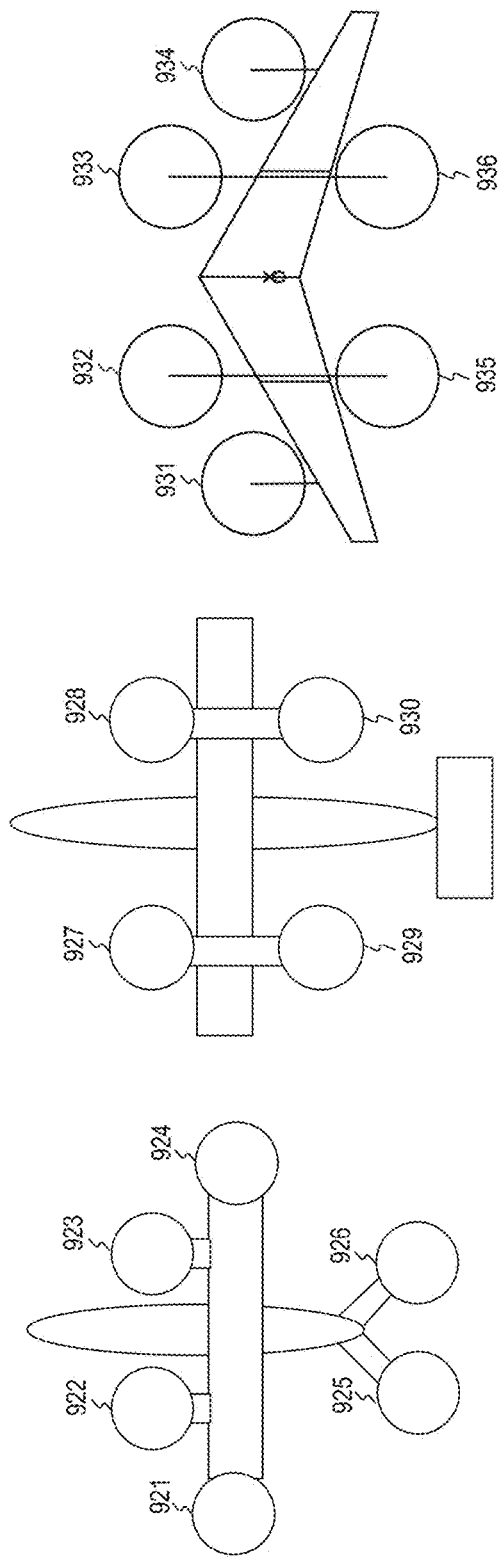

SYSTEMS AND METHODS FOR APPLYING A MOVABLE NOTCH FILTER IN FLIGHT CONTROL OF EVTOL AIRCRAFT

PRIORITY CLAIM

This disclosure claims priority to U.S. Provisional Application No. 63/512,784 titled "SYSTEMS AND METHODS FOR FLIGHT CONTROL OF EVTOL AIRCRAFT," filed Jul. 10, 2023, the contents of which are incorporated herein in their entirety for all purposes.

TECHNICAL FIELD

This disclosure relates generally to powered aerial vehicles. More particularly, and without limitation, the present disclosure relates to innovations in aircrafts driven by electric propulsion systems. Certain aspects of the present disclosure generally relate to systems and methods for flight control of aircrafts driven by electric propulsion systems and in other types of vehicles, as well as flight control of aircrafts in flight simulators and video games. Other aspects of the present disclosure generally relate to improvements in flight control systems and methods that provide particular advantages in aerial vehicles and may be used in other types of vehicles.

BACKGROUND

The inventors here have recognized several problems that may be associated with flight control of aircraft, including a tilt-rotor aircraft that uses electrical or hybrid-electric propulsion systems (hereinafter referred to as electric propulsion units or "EPUs"). For example, spinning propellers on an aircraft can generate significant vibrations at multiple frequencies. Propeller vibrations are particularly strong on propellers with a lower number of blades, such as two and three-bladed propellers used on many electric aircrafts. These vibrations may propagate through an engine and aircraft structure, to inertial measurement units (IMU) contained in onboard sensing equipment. Accordingly, the significant vibrations may corrupt the aircraft's state estimate based on IMU measurements, which may feed through the flight control system, resulting in high-frequency commands to flight elements (e.g., actuators, control surfaces, and engines). The high-frequency commands may result in increased power consumption, increased temperatures, increased cycles and wear, and may contribute to increased cabin and community noise, as well as decreased ride quality. Further, flight control system reliance on corrupted aircraft state estimates may adversely impact the controllability, stability, and safety of the aircraft.

Further, propeller vibrations may vary in magnitude based on propeller speed and edgewise airflow. The propeller vibrations may be more significant at certain frequencies. For example, vibrations at frequencies proportional to the propeller speed may lead to resonance and amplification of vibrations. Further, propeller vibrations may be more significant with increased edgewise airflow, where the rotation axis is perpendicular to aircraft trajectory.

SUMMARY

The present disclosure relates generally to flight control of electric aircraft and other powered aerial vehicles. More particularly, and without limitation, the present disclosure relates to innovations in tilt-rotor aircraft that use electrical propulsion systems. For example, certain aspects of the present disclosure relate to filtering signals to lessen and/or remove the impact of propeller vibrations and controlling the aircraft according to the filtered signals. Further, certain embodiments may adjust the filter according to propeller speed and edgewise airflow to ensure the propeller vibrations are appropriately and reliably filtered while avoiding negative impacts to true aircraft state measurements. For example, in some embodiments, the filter is adjusted based on a measured propeller speed to ensure the filter placement is accurate even when the aircraft propeller(s) are not behaving as commanded. For example, in some embodiments, the filter is adjusted based on only propeller speed and edgewise airflow, and therefore the filter is not improperly adjusted based on the influence of other sources (e.g., other vibrations and/or unexpected aircraft movement).

One aspect of the present disclosure is directed to an electrical system for an aircraft, comprising: at least one processor configured to: receive first sensor data from at least one inertial sensor of the aircraft, wherein the first sensor data is indicative of a state of the aircraft, receive second sensor data from at least one of an airspeed sensor indicating an airspeed of the aircraft or a propeller speed sensor indicating a propeller speed of at least one propeller of the aircraft, and determine the state of the aircraft based on the first sensor data, wherein determining the state of the aircraft comprises filtering aircraft state measurements based on the second sensor data to lessen influence of propeller vibrations on at least one aircraft signal. The at least one processor controls the aircraft based on a pilot input command and the determined state of the aircraft.

Another aspect of the present disclosure comprises an aircraft, including at least one processor configured to: receive first sensor data from at least one inertial sensor of the aircraft, wherein the first sensor data is indicative of a state of the aircraft, receive second sensor data from at least one of an airspeed sensor indicating an airspeed of the aircraft or a propeller speed sensor indicating a propeller speed of at least one propeller of the aircraft, and determine the state of the aircraft based on the first sensor data, wherein determining the state of the aircraft comprises filtering aircraft state measurements based on the second sensor data to lessen influence of propeller vibrations on at least one aircraft signal. The at least one processor controls the aircraft based on a pilot input command and the determined state of the aircraft.

Yet another aspect of the present disclosure comprises a method for controlling an aircraft, comprising: receiving first sensor data from at least one inertial sensor of the aircraft, wherein the first sensor data is indicative of a state of the aircraft, receiving second sensor data from at least one of an airspeed sensor indicating an airspeed of the aircraft or a propeller speed sensor indicating a propeller speed of at least one propeller of the aircraft, and determining the state of the aircraft based on the first sensor data, wherein determining the state of the aircraft comprises filtering aircraft state measurements based on the second sensor data to lessen influence of propeller vibrations on at least one aircraft signal. The method further comprises controlling the aircraft based on a pilot input command and the determined state of the aircraft.

BRIEF DESCRIPTION OF THE DRAWINGS

FIGS. 9A, 9B, 9C, 9D, and 9E illustrate exemplary top plane views of VTOL aircraft, consistent with disclosed embodiments.

DETAILED DESCRIPTION

Figure 1:
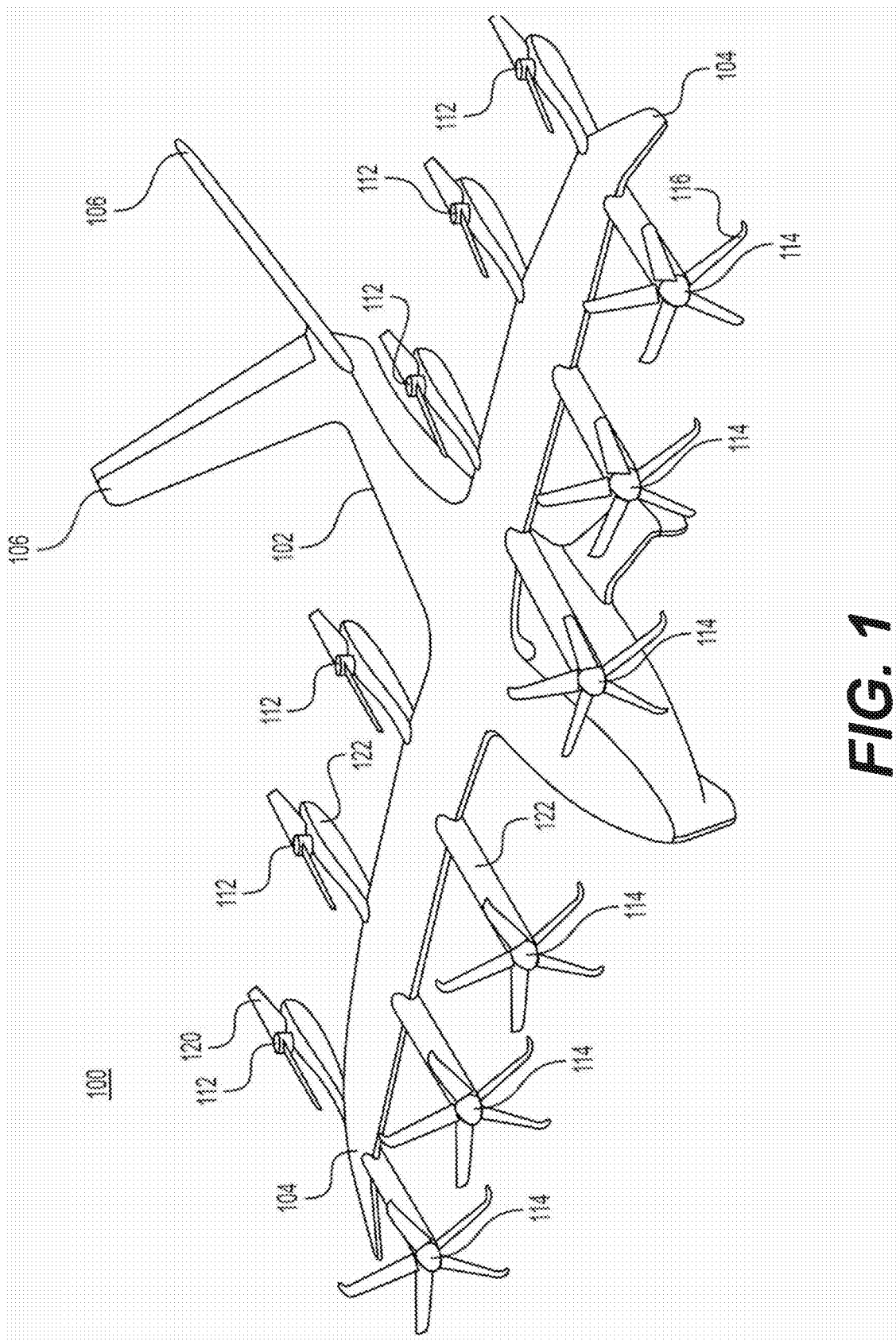
FIG. 1 shows an exemplary vertical takeoff and landing (VTOL) aircraft, consistent with disclosed embodiments.

The present disclosure addresses systems, components, and techniques primarily for use in an aircraft. The aircraft may be an aircraft with a pilot, an aircraft without a pilot (e.g., a UAV), a drone, a helicopter, and/or an airplane. An aircraft includes a physical body and one or more components (e.g., a wing, a tail, a propeller) configured to allow the aircraft to fly. The aircraft may include any configuration that includes at least one propeller. In some embodiments, the aircraft is driven by one or more electric propulsion systems (hereinafter referred to as electric propulsion units or "EPUs"). The aircraft may be fully electric, hybrid, or gas powered. For example, in some embodiments, the aircraft is a tilt-rotor aircraft configured for frequent (e.g., over 50 flights per work day), short-duration flights (e.g., less than 100 miles per flight) over, into, and out of densely populated regions. The aircraft may be configured to carry 4-6 passengers or commuters who have an expectation of a comfortable experience with low noise and low vibration. Accordingly, it is desirable to control the aircraft components in a manner that avoids high frequency commands which generate vibration, heat, and noise.

Disclosed embodiments provide new and improved configurations of aircraft components, some of which are not observed in conventional aircraft, and/or identified design criteria for components that differ from those of conventional aircraft. Such alternate configurations and design criteria, in combination addressing drawbacks and challenges with conventional components, yielded the embodiments disclosed herein for various configurations and designs of components for an aircraft (e.g., electric aircraft or hybrid-electric aircraft) driven by a propulsion system.

In some embodiments, the aircraft driven by a propulsion system of the present disclosure may be designed to be capable of both vertical and conventional takeoff and landing, with a distributed propulsion system enabling vertical flight, horizontal and lateral flight, and transition (e.g., transitioning between vertical flight and horizontal flight). The aircraft may generate thrust by supplying high voltage electrical power to a plurality of engines of the distributed propulsion system, which may include components to convert the high voltage electrical power into mechanical shaft power to rotate a propeller.

Embodiments may include an electric engine connected to an onboard electrical power source, which may include a device capable of storing energy such as a battery or capacitor, and may optionally include one or more systems for harnessing or generating electricity such as a fuel powered generator or solar panel array. In some embodiments, the aircraft may comprise a hybrid aircraft using at least one of an electric-based energy source or a fuel-based energy source to power the distributed propulsion system. In some embodiments, the aircraft may be powered by one or more batteries, internal combustion engines (ICE), generators, turbine engines, or ducted fans.

The engines may be mounted directly to the wing, or mounted to one or more booms attached to the wing. The amount of thrust each engine generates may be governed by a torque command from a Flight Control System (FCS) over a digital communication interface to each engine. Embodiments may include forward engines (and associated propellers) that are capable of altering their orientation, or tilt.

The engines may rotate the propellers in a clockwise or counterclockwise direction. In some embodiments, the difference in propeller rotation direction may be achieved using the direction of engine rotation. In other embodiments, the engines may all rotate in the same direction, and gearing may be used to achieve different propeller rotation directions.

In some embodiments, an aircraft may possess quantities of engines in various combinations of forward and aft engine configurations. A forward engine may be considered an engine that is positioned predominantly towards the leading edge of a wing. An aft engine may be considered an engine that is positioned predominantly towards the trailing edge of a wing. For example, an aircraft may possess six forward and six aft engines, five forward and five aft engines, four forward and four aft engines, three forward and three aft engines, two forward and two aft engines, or any other combination of forward and aft engines, including embodiments where the number of forward engines and aft engines are not equivalent.

In some embodiments, for a vertical takeoff and landing (VTOL) mission, the forward and aft engines may provide vertical thrust during takeoff and landing. During flight phases where the aircraft is moving forward, the forward engines may provide horizontal thrust, while the propellers of the aft engines may be stowed at a fixed position in order to minimize drag. The aft engines may be actively stowed with position monitoring.

Transition from vertical flight to horizontal flight and vice-versa may be accomplished via the tilt propeller subsystem. The tilt propeller subsystem may redirect thrust between a primarily vertical direction during vertical flight phase (e.g., hover-phase) to a horizontal or near-horizontal direction during a forward-flight cruising phase, based on a tilt of one or more propellers (e.g., determining directionality of one or more propellers). A variable pitch mechanism may change the forward engine's propeller-hub assembly blade collective angles for operation during phases of flight, such as a hover-phase, transition phase, and cruise-phase. Vertical lift may be thrust in a primarily vertical direction (e.g., during a hover-phase). Horizontal thrust may be thrust in a primarily horizontal direction (e.g., during a cruise-phase).

In some embodiments, in a conventional takeoff and landing (CTOL) mission, the forward engines may provide horizontal thrust for wing-borne take-off, cruise, and landing, and the wings may provide vertical lift. In some embodiments, the aft engines may not be used for generating thrust during a CTOL mission and the aft propellers may be stowed in place. In other embodiments, the aft engines may be used at reduced power to shorten the length of the CTOL takeoff or landing.

As detailed above, embodiments of the aircraft may include many movable structural flight elements that allow pilots to safely control the aircraft. Flight control surfaces (e.g., ailerons, elevators, rudders, etc.) are critical to controlling the positioning of the aircraft. Changes to the orientation of these surfaces changes the airflow and pressure distribution around the aircraft, allowing the pilot to control the movement of the aircraft in three axes of rotation. Similarly, rotation and orientation control of propellers may provide lift support (e.g., lift required for vertical take-off, landing, and hovering) and may provide the forward thrust required to move the aircraft through the air. The movement of each of these flight elements is critical to the safety and stability of the aircraft.

As further detailed below with reference to FIG. 10, control signals to these flight elements may be based on pilot input, autopilot input, and sensor input from various aircraft sensors. Sensor input may include data from inertial measurement units (IMU) and corresponding sensors (e.g., accelerometers and gyroscopes). This sensor input may be influenced by propeller vibrations and the significance of this influence may vary according to the propeller speed and edgewise airflow.

The disclosed embodiments lessen and/or remove the influence of propeller vibrations in aircraft state estimates by applying filters (e.g., notch filters) that vary according to propeller speed and edgewise airflow. In some embodiments, the applied filter is a notch filter. A notch filter is a filter designed to attenuate or eliminate a specific frequency or band of frequencies within a broader frequency spectrum. For example, a notch filter may be designed to have high attenuation (i.e., a reduction in signal strength) at a specific frequency or a narrow range of frequencies, while allowing other frequencies to pass through. Further, the disclosed embodiments apply notch filters with one or more stopband regions defining the area where a filter should be applied. Outside the stopband region, no filter is applied to ensure that true IMU measurements are not erroneously filtered.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the subject matter recited in the appended claims.

Figure 2:
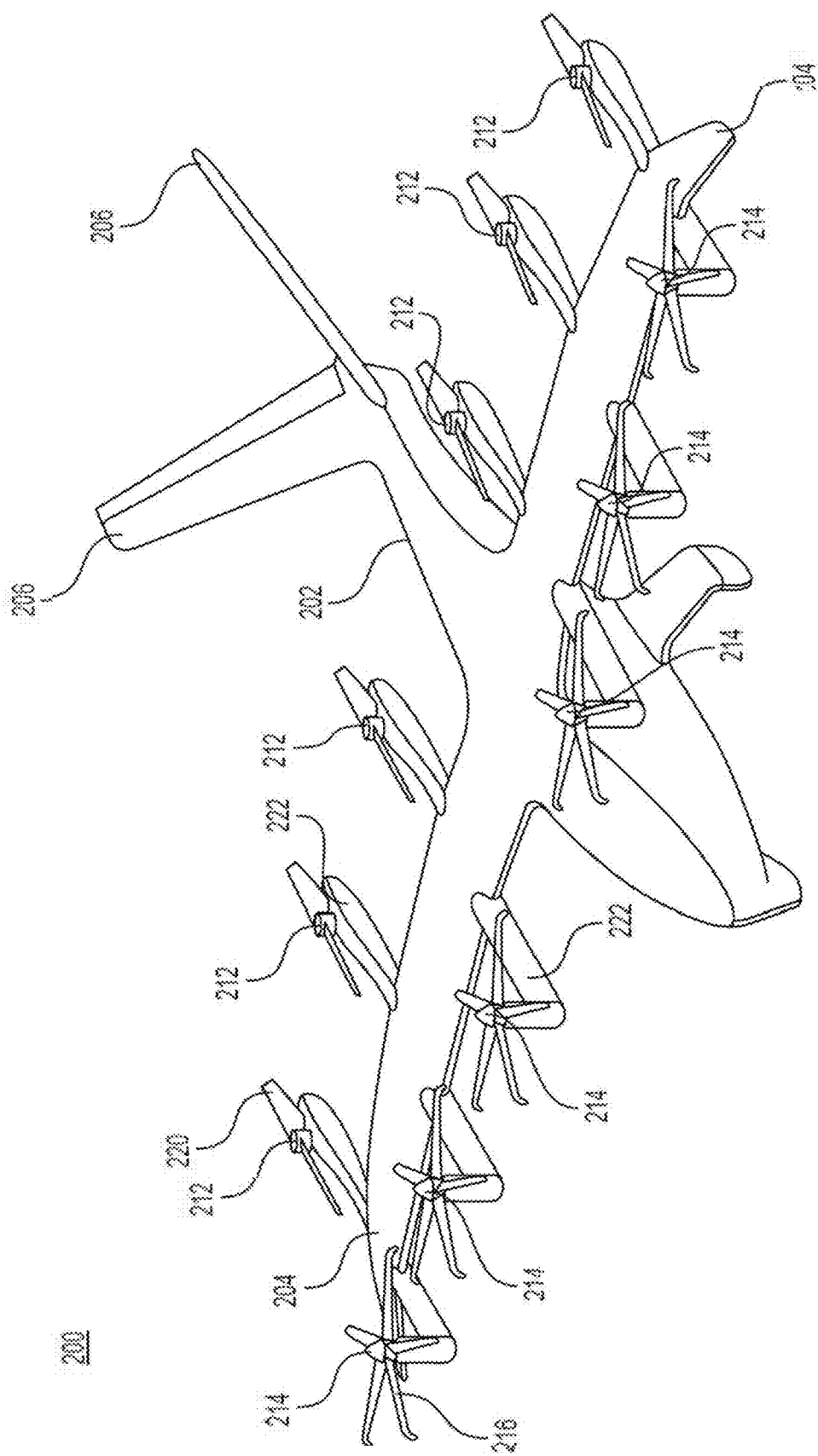
FIG. 2 shows an exemplary VTOL aircraft, consistent with disclosed embodiments.

FIG. 1 is an illustration of a perspective view of an exemplary VTOL aircraft, consistent with disclosed embodiments. FIG. 2 is another illustration of a perspective view of an exemplary VTOL aircraft in an alternative configuration, consistent with embodiments of the present disclosure. FIGS. 1 and 2 illustrate a VTOL aircraft 100, 200 in a cruise configuration and a vertical take-off, landing and hover configuration (also referred to herein as a "lift" configuration), respectively, consistent with embodiments of the present disclosure. Elements corresponding to FIGS. 1 and 2 may possess like numerals and refer to similar elements of the aircrafts 100, 200. The aircraft 100, 200 may include a fuselage 102, 202, wings 104, 204 mounted to the fuselage 102, 202 and one or more rear stabilizers 106, 206 mounted to the rear of the fuselage 102, 202. A plurality of lift propellers 112, 212 may be mounted to wings 104, 204 and may be configured to provide lift for vertical take-off, landing and hover. A plurality of tilt propellers 114, 214 may be mounted to wings 104, 204 and may be tiltable (e.g., configured to tilt or alter orientation) between the lift configuration in which they provide a portion of the lift required for vertical take-off, landing and hovering, as shown in FIG. 2, and the cruise configuration in which they provide forward thrust to aircraft 100 for horizontal flight, as shown in FIG. 1. As used herein, a tilt propeller lift configuration refers to any tilt propeller orientation in which the tilt propeller thrust is providing primarily lift to the aircraft and tilt propeller cruise configuration refers to any tilt propeller orientation in which the tilt propeller thrust is providing primarily forward thrust to the aircraft.

In some embodiments, lift propellers 112, 212 may be configured for providing lift only, with all horizontal propulsion being provided by the tilt propellers. For example, lift propellers 112, 212 may be configured with fixed positions and may only generate thrust during take-off, landing and hover phases of flight. Meanwhile, tilt propellers 114, 214 may be tilted upward into a lift configuration in which thrust from propellers 114, 214 is directed downward to provide additional lift.

For forward flight, tilt propellers 114, 214 may tilt from their lift configurations to their cruise configurations. In other words, the orientation of tilt propellers 114, 214 may be varied from an orientation in which the tilt propeller thrust is directed downward (to provide lift during vertical take-off, landing and hover) to an orientation in which the tilt propeller thrust is directed rearward (to provide forward thrust to aircraft 100, 200). The tilt propellers assembly for a particular electric engine may tilt about an axis of rotation defined by a mounting point connecting the boom and the electric engine. When the aircraft 100, 200 is in full forward flight, lift may be provided entirely by wings 104, 204. Meanwhile, in the cruise configuration, lift propellers 112, 212 may be shut off. The blades 120, 220 of lift propellers 112, 212 may be held in low-drag positions for aircraft cruising. In some embodiments, lift propellers 112, 212 may each have two blades 120, 220 that may be locked, for example while the aircraft is cruising, in minimum drag positions in which one blade is directly in front of the other blade as illustrated in FIG. 1. In some embodiments, lift propellers 112, 212 have more than two blades. In some embodiments, tilt propellers 114, 214 may include more blades 116, 216 than lift propellers 112, 212. For example, as illustrated in FIGS. 1 and 2, lift propellers 112, 212 may each include, e.g., two blades, whereas and tilt propellers 114, 214 may each include more blades, such as the five blades shown. In some embodiments, each of the tilt propellers 114, 214 may have 2 to 5 blades, and possibly more depending on the design considerations and requirements of the aircraft.

In some embodiments, the aircraft may include a single wing 104, 204 on each side of fuselage 102, 202 (or a single wing that extends across the entire aircraft). At least a portion of lift propellers 112, 212 may be located rearward of wings 104, 204 (e.g., rotation point of propeller is behind a wing from a bird's eye view) and at least a portion of tilt propellers 114, 214 may be located forward of wings 104, 204 (e.g., rotation point of propeller is in front of a wing from a bird's eye view). In some embodiments, all of lift propellers 112, 212 may be located rearward of wings 104, 204 and all of tilt propellers 114, 214 may be located forward of wings 104, 204. According to some embodiments, all lift propellers 112, 212 and tilt propellers 114, 214 may be mounted to the wings—i.e., no lift propellers or tilt propellers may be mounted to the fuselage. In some embodiments, lift propellers 112, 212 may be all located rearwardly of wings 104, 204 and tilt propellers 114, 214 may be all located forward of wings 104, 204. According to some embodiments, all lift propellers 112, 212 and tilt propellers 114, 214 may be positioned inwardly of the ends of the wing 104, 204.

In some embodiments, lift propellers 112, 212 and tilt propellers 114, 214 may be mounted to wings 104, 204 by booms 122, 222. Booms 122, 222 may be mounted beneath wings 104, 204, on top of the wings, and/or may be integrated into the wing profile. In some embodiments, lift propellers 112, 212 and tilt propellers 114, 214 may be mounted directly to wings 104, 204. In some embodiments, one lift propeller 112, 212 and one tilt propeller 114, 214 may be mounted to each boom 122, 222. Lift propeller 112, 212 may be mounted at a rear end of boom 122, 222 and tilt propeller 114, 214 may be mounted at a front end of boom 122, 222. In some embodiments, lift propeller 112, 212 may be mounted in a fixed position on boom 122, 222. In some embodiments, tilt propeller 114, 214 may mounted to a front end of boom 122, 222 via a hinge. Tilt propeller 114, 214 may be mounted to boom 122, 222 such that tilt propeller 114, 214 is aligned with the body of boom 122, 222 when in its cruise configuration, forming a continuous extension of the front end of boom 122, 222 that minimizes drag for forward flight.

In some embodiments, aircraft 100, 200 may include, e.g., one wing on each side of fuselage 102, 202 or a single wing that extends across the aircraft. According to some embodiments, the at least one wing 104, 204 is a high wing mounted to an upper side of fuselage 102, 202. According to some embodiments, the wings include control surfaces, such as flaps and/or ailerons. According to some embodiments, wings 104, 204 may have a profile that reduces drag during forward flight. In some embodiments, the wing tip profile may be curved and/or tapered to minimize drag.

In some embodiments, rear stabilizers 106, 206 include control surfaces, such as one or more rudders, one or more elevators, and/or one or more combined rudder-elevators. The wing(s) may have any suitable design for providing lift, directionality, stability, and/or any other characteristic beneficial for aircraft. In some embodiments, the wings have a tapering leading edge.

In some embodiments, lift propellers 112, 212 or tilt propellers 114, 214 may be canted relative to at least one other lift propeller 112, 212 or tilt propeller 114, 214, where canting refers to a relative orientation of the rotational axis of the lift propeller/tilt propeller about a line that is parallel to the forward-rearward direction, analogous to the roll degree of freedom of the aircraft.

In some embodiments, one or more lift propellers 112, 212 and/or tilt propellers 114, 214 may canted relative to a cabin of the aircraft, such that the rotational axis of the propeller in a lift configuration is angled away from an axis perpendicular to the top surface of the aircraft. For example, in some embodiments, the aircraft is a flying wing aircraft as shown in FIG. 9E below, and some or all of the propellers are canted away from the cabin.

Figures 3, 4:
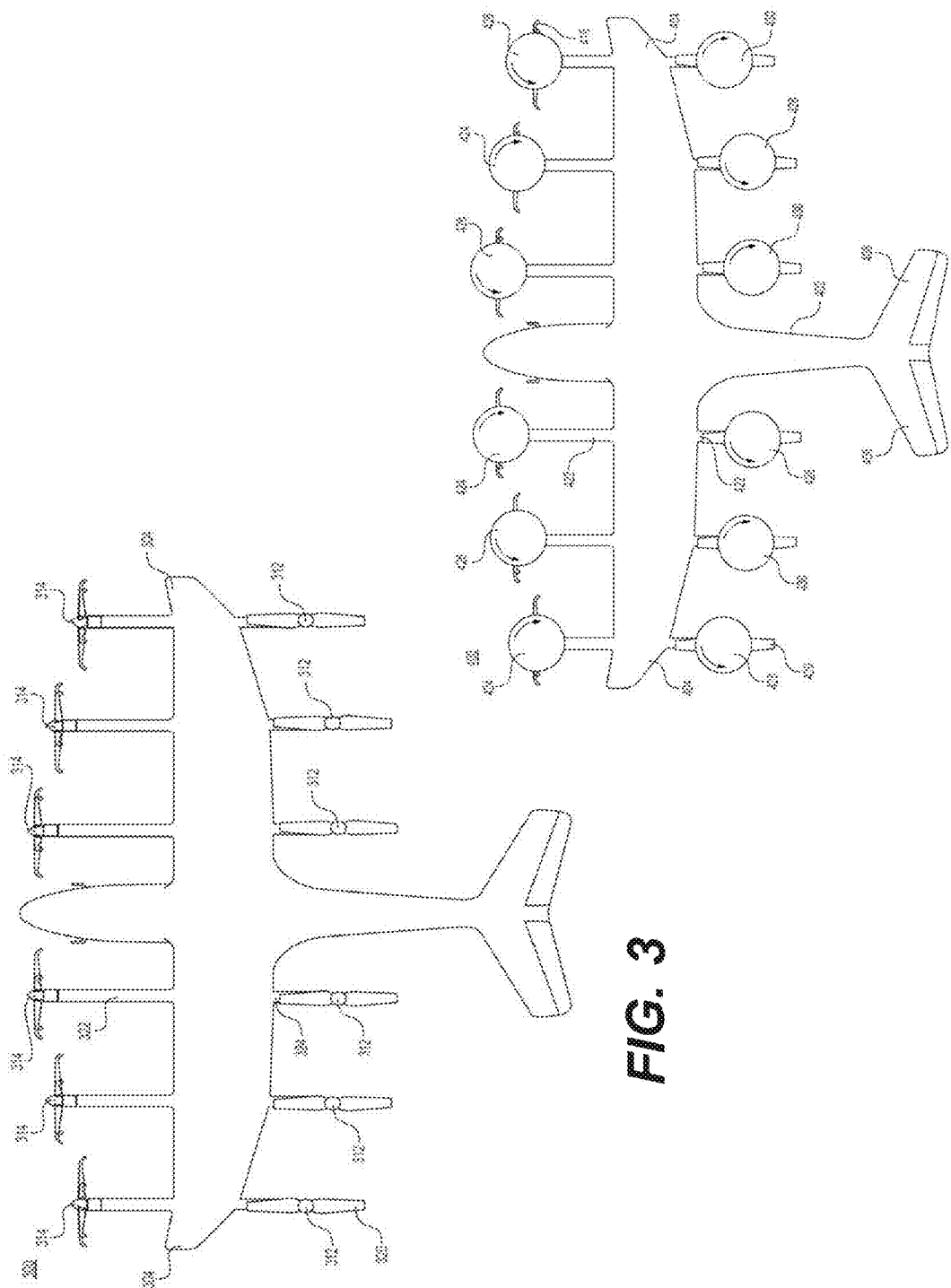
FIG. 3 shows an exemplary top plane view of a VTOL aircraft, consistent with disclosed embodiments.
FIG. 4 illustrates exemplary propeller rotation of a VTOL aircraft, consistent with disclosed embodiments.

FIG. 3 is an illustration of a top plane view of an exemplary VTOL aircraft, consistent with embodiments of the present disclosure. Aircraft 300 shown in the figure may be a top plan view of the aircraft 100, 200 shown in FIGS. 1 and 2, respectively. As discussed herein, an aircraft 300 may include twelve electric propulsion systems distributed across the aircraft 300. In some embodiments, a distribution of electric propulsion systems may include six forward electric propulsion systems 314 and six aft electric propulsion systems 312 mounted on booms forward and aft of the main wings 304 of the aircraft 300. In some embodiments, a length of the rear end of the boom 324 from the wing 304 to a lift propeller (part of electric propulsion system 312) may comprise a similar rear end of the boom 324 length across the numerous rear ends of the booms. In some embodiments, the length of the rear ends of the booms may vary, for example, across the six rear ends of the booms. Further, FIG. 3 depicts an exemplary embodiment of a VTOL aircraft 300 with forward propellers (part of electric propulsion system 314) in a horizontal orientation for horizontal flight and aft propeller blades 320 in a stowed position for a forward phase of flight.

FIG. 4 is a schematic diagram illustrating exemplary propeller rotation of a VTOL aircraft, consistent with disclosed embodiments. Aircraft 400 shown in the figure may be a top plan view of the aircraft 100, 200, and 300 shown in FIGS. 1, 2, and 3, respectively. An aircraft 400 may include six forward electric propulsion systems with three of the forward electric propulsion systems being of CW type 424 and the remaining three forward electric propulsion systems being of CCW type. In some embodiments, three aft electric propulsion systems may be of CCW type 428 with the remaining three aft electric propulsion systems being of CW type 430. Some embodiments may include an aircraft 400 possessing four forward electric propulsion systems and four aft electric propulsion systems, each with two CW types and two CCW types. In some embodiments, propellers may counter-rotate with respect to adjacent propellers to cancel torque steer, generated by the rotation of the propellers, experienced by the fuselage or wings of the aircraft. In some embodiments, the difference in rotation direction may be achieved using the direction of engine rotation. In other embodiments, the engines may all rotate in the same direction, and gearing may be used to achieve different propeller rotation directions.

Some embodiments may include an aircraft 400 possessing forward and aft electric propulsion systems where the amount of CW types 424 and CCW types 426 is not equal among the forward electric propulsion systems, among the aft electric propulsion systems, or among the forward and aft electric propulsion systems.

Figure 5:
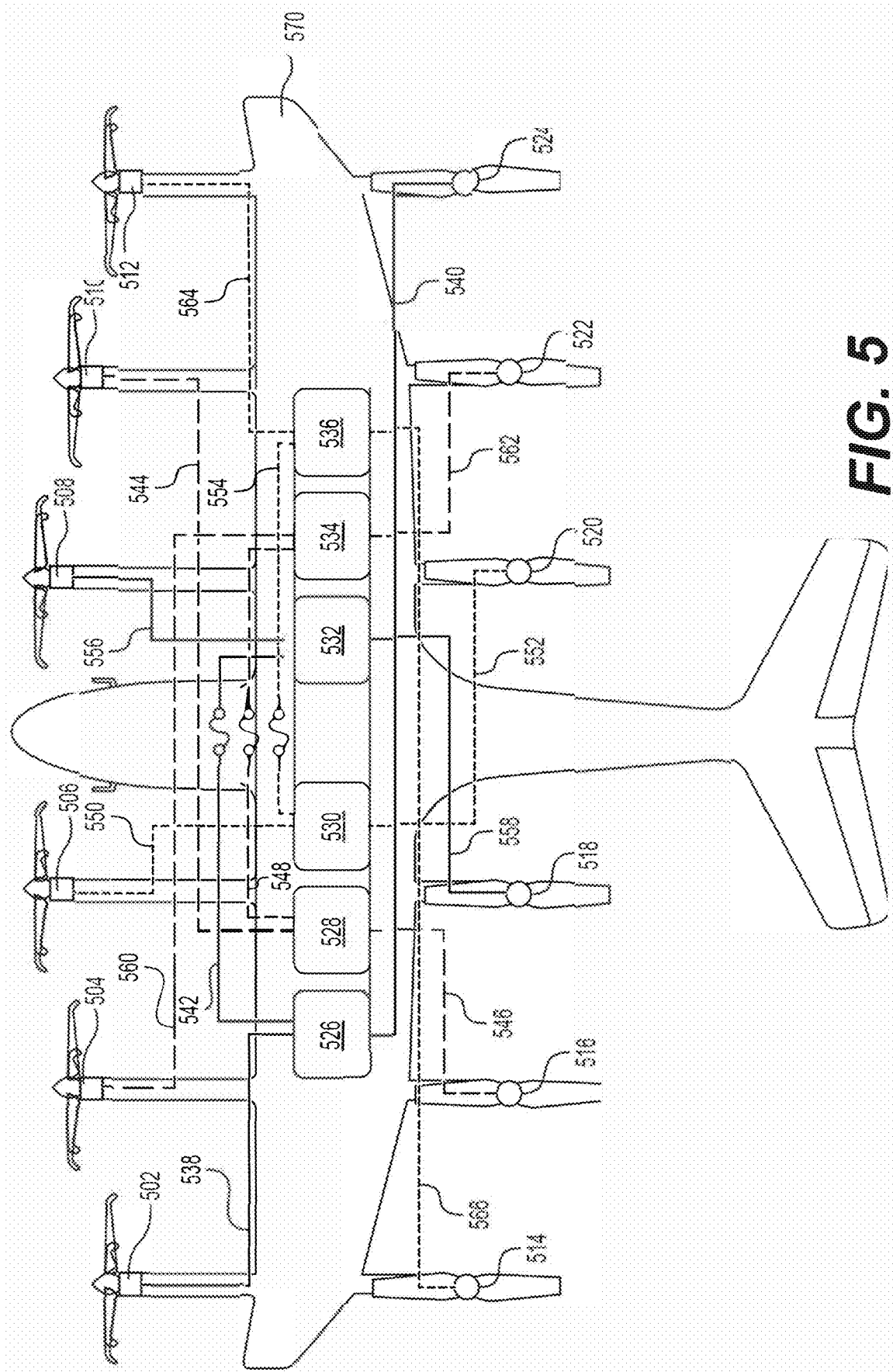
FIG. 5 shows exemplary power connections in a VTOL aircraft, consistent with disclosed embodiments.

FIG. 5 is a schematic diagram illustrating exemplary power connections in a VTOL aircraft, consistent with disclosed embodiments. A VTOL aircraft may have multiple power systems connected to diagonally opposing electric propulsion systems. In some embodiments, the power systems may include high voltage power systems. Some embodiments may include high voltage power systems connected to electric engines via high voltage channels. In some embodiments, an aircraft 500 may include six power systems (e.g., battery packs), including power systems 526, 528, 530, 532, 534, and 536 stored within the wing 570 of the aircraft 500. The power systems may power electric propulsion systems and/or other electric components of the aircraft 500. In some embodiments, the aircraft 500 may include six forward electric propulsion systems having six electric engines 502, 504, 506, 508, 510, and 512 and six aft electric propulsion systems having six electric engines 514, 516, 518, 520, 522, and 524. In some embodiments, one or more power systems (e.g., battery packs) may include a battery management system ("BMS") (e.g., one BMS for each battery pack). While six power systems are shown in FIG. 5, the aircraft 500 may include any number and/or configuration of power systems.

Figure 6:
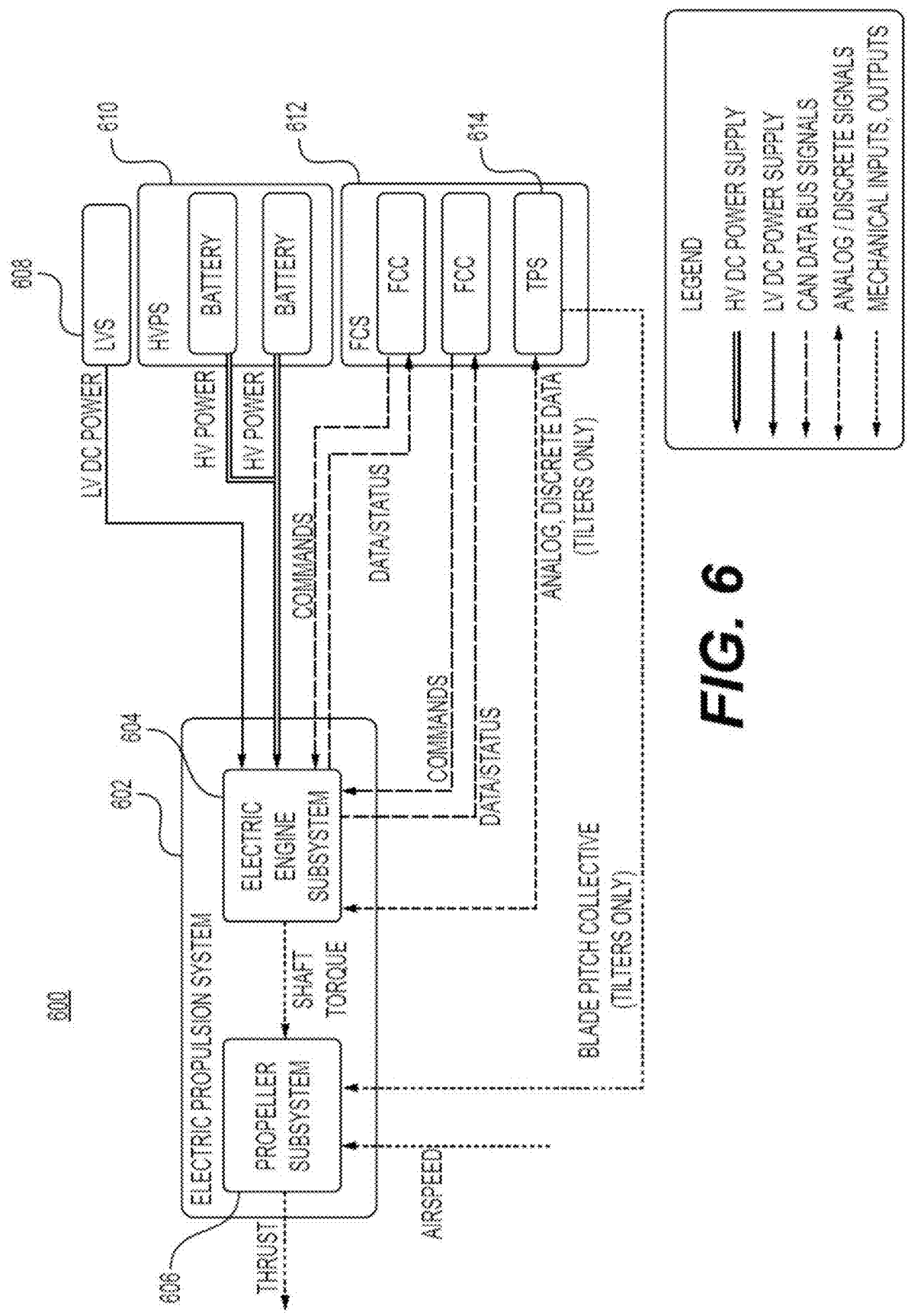
FIG. 6 shows an exemplary architecture of an electric propulsion unit, consistent with disclosed embodiments.

In some embodiments, the one or more battery management systems may communicate with a Flight Control System ("FCS") of the aircraft (e.g., FCS 612 shown in FIG. 6). For example, the FCS may monitor the status of one or more battery packs and/or provide commands to the one or more battery management systems which make corresponding adjustments to the high voltage power supply. As described above, high frequency commands may increase power consumption. In some embodiments, as shown in FIG. 5, this power consumption may drain battery packs connected to multiple electric engines. Therefore, there is a need to control the aircraft in a manner that avoids high frequency commands.

FIG. 6 illustrates block diagram of an exemplary architecture and design of an electric propulsion unit 600 consistent with disclosed embodiments. Exemplary electric propulsion unit 600 includes an electric propulsion system 602, which may be configured to control aircraft propellers. Electric propulsion system 602 may include an electric engine subsystem 604 that may supply torque, via a shaft, to a propeller subsystem 606 to produce the thrust of the electric propulsion system 602. Some embodiments may include the electric engine subsystem 604 receiving low voltage direct current (LV DC) power from a Low Voltage System (LVS) 608. In some embodiments, the electric engine subsystem 604 may be configured to receive high voltage (HV) power from a High Voltage Power System (HVPS) 610 comprising at least one battery or other device capable of storing energy. HV power may refer to power that is lower in voltage than voltage provided by Low Voltage System (LVS) 608.

Some embodiments may include an electric propulsion system 602 including an electric engine subsystem 604 receiving signals from and sending signals to a flight control system 612. In some embodiments, a flight control system (FCS) 612 may comprise a flight control computer capable of using Controller Area Network ("CAN") data bus signals to send commands to the electric engine subsystem 604 and receive status and data from the electric engine subsystem 604. It should be understood that while CAN data bus signals are used between the flight control computer and the electric engine(s), some embodiments may include any form of communication with the ability to send and receive data from a flight control computer to an electric engine. Some embodiments may include electric engine subsystems 604 capable of receiving operating parameters from and communicating operating parameters to an FCC in FCS 612, including speed, voltage, current, torque, temperature, vibration, propeller position, and/or any other value of operating parameters.

In some embodiments, a flight control system 612 may also include a Tilt Propeller System ("TPS") 614 capable of sending and receiving analog, discrete data to and from the electric engine subsystem 604 of the tilt propellers. A tilt propeller system 614 may include an apparatus capable of communicating operating parameters to an electric engine subsystem 604 and articulating an orientation of the propeller subsystem 606 to redirect the thrust of the tilt propellers during various phases of flight using mechanical means such as a gearbox assembly, linear actuators, and any other configuration of components to alter an orientation of the propeller subsystem 606. In some embodiments, electric engine subsystem may communicate an orientation of the propeller system (e.g., an angle between lift and forward thrust) to TPS 614 and/or FCS 612 (e.g., during flight).

Figure 7:
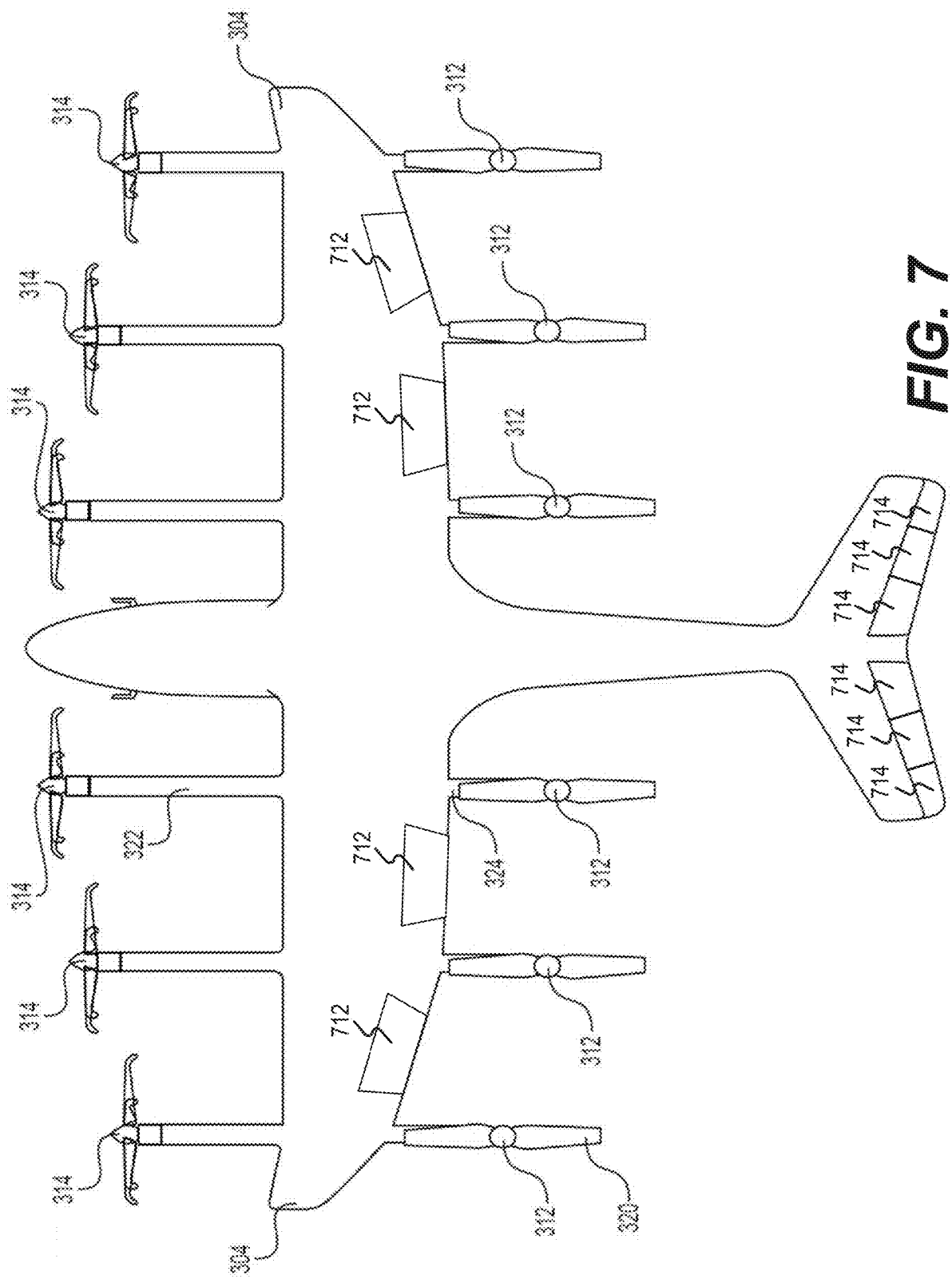
FIG. 7 shows an exemplary top plane view of a VTOL aircraft, consistent with disclosed embodiments.

In some embodiments, a flight control system may include a system capable of controlling control surfaces and their associated actuators in an exemplary VTOL aircraft. FIG. 7 is an illustration of a top plane view of an exemplary VTOL aircraft, consistent with embodiments of the present disclosure. Aircraft 700 shown in the figure may be a top plan view of the aircraft 100, 200 shown in FIGS. 1 and 2, respectively. In aircraft 700, the control surfaces may include, in addition to the propeller blades discussed earlier, flaperons 712 and ruddervators 714. Flaperons 712 may combine functions of one or more flaps, one or more ailerons, and/or one or more spoilers. Ruddervators 714 may combine functions or one or more rudders and/or one or more elevators. Additionally or alternatively, control surfaces may include separate rudders and elevators. In aircraft 700, the actuators may include, in addition to the electric propulsion systems discussed earlier, control surface actuators (CSAs) associated with flaperons 712 and ruddervators 714, as discussed further below with reference to FIG. 8.

Figure 8:
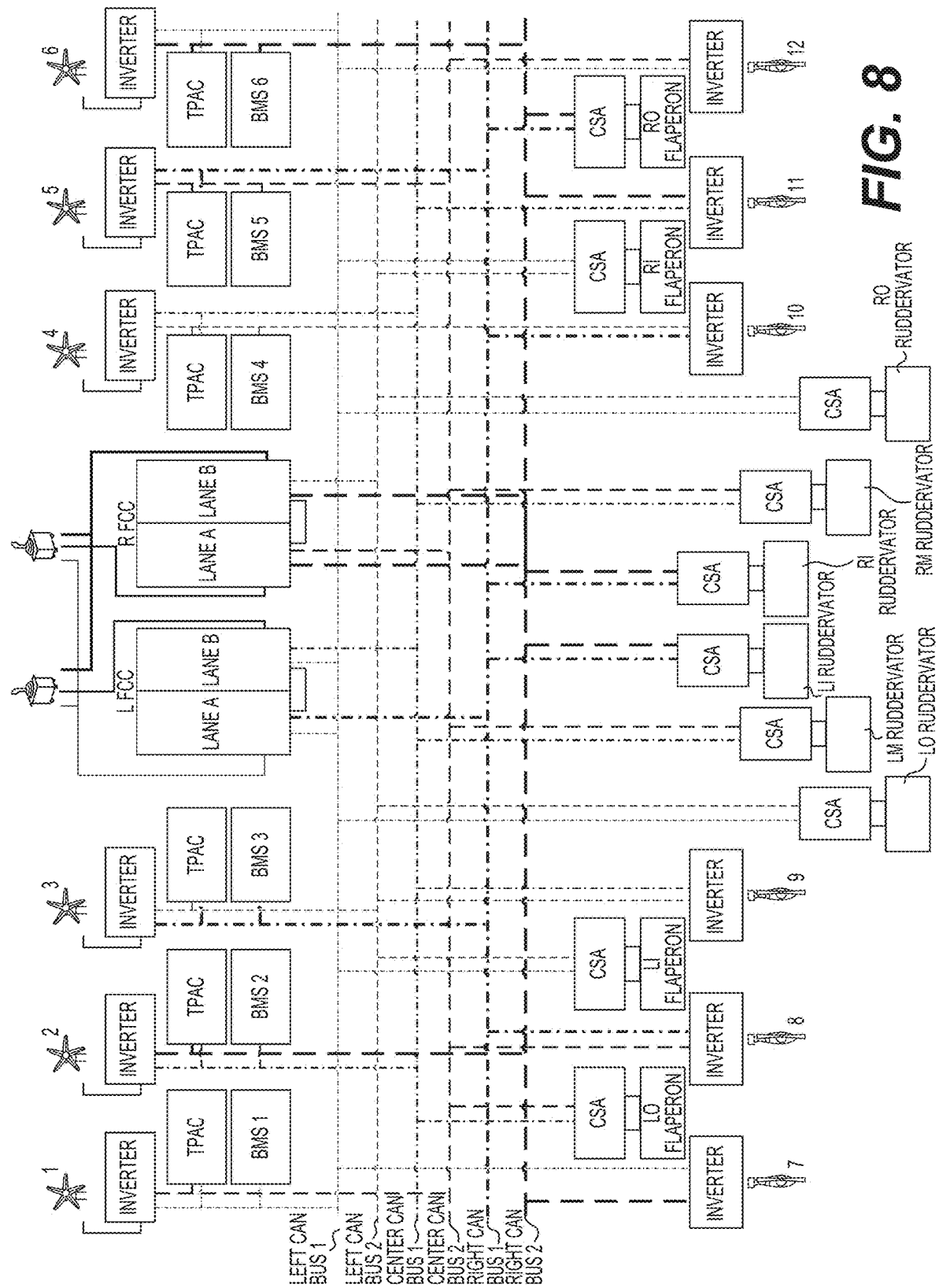
FIG. 8 shows an exemplary flight control signaling architecture, consistent with disclosed embodiments.

FIG. 8 illustrates a flight control signaling architecture for controlling the control surfaces and associated actuators, according to various embodiments. Although FIG. 7 illustrates twelve EPU inverters and associated propeller blades, six tilt propeller actuators (TPACs), six battery management systems (BMSs), four flaperons and associated control surface actuators (CSAs), and six ruddervators and associated CSAs, aircraft according to various embodiments can have any suitable number of these various elements. As shown in FIG. 8, control surfaces and actuators may be controlled by a combination of four flight control computers (FCCs)— Left FCC, Lane A (L FCC-A), Left FCC, Lane B (L FCC-B), Right FCC, Lane A (R FCC-A), and Right FCC, Lane A (R FCC-B), although any other suitable number of FCCs may be utilized. The FCCs may each individually control all control surfaces and actuators or may do so in any combination with each other. In some embodiments, each FCC may include one or more hardware computing processors. In some embodiments, each FCC may utilize a single-threaded computing process or a multi-threaded computing process to perform the computations required to control the control surfaces and actuators. In some embodiments, all computing processes required to control the control surfaces and actuators may be performed on a single computing thread by a single flight control computer.

The FCCs may provide control signals to the control surface actuators, including the EPU inverters, TPACs, BMSs, flaperon CSAs, and ruddervator CSAs, via one or more bus systems. For different control surface actuators, the FCC may provide control signals, such as voltage or current control signals, and control information may be encoded in the control signals in binary, digital, or analog form. In some embodiments, the bus systems may each be a CAN bus system, e.g., Left CAN bus 1, Left CAN bus 2, Right CAN bus 1, Right CAN bus 2, Center CAN bus 1, Center CAN bus 2 (see FIG. 8). In some embodiments, multiple FCCs may be configured to provide control signals via each CAN bus system, and each FCC may be configured to provide control signals via multiple CAN bus systems. In the exemplary architecture illustrated in FIG. 8, for example, L FCC-A may provide control signals via Left CAN bus 1 and Right CAN bus 1, L FCC-B may provide control signals via Left CAN bus 1 and Center CAN bus 1, R FCC-A may provide control signals via Center CAN bus 2 and Right CAN bus 2, and R FCC-B may provide control signals via Left CAN bus 2 and Right CAN bus 2.

FIGS. 9A-9E are illustrations of a top plane view of exemplary VTOL aircrafts, consistent with embodiments of the present disclosure. There may be a number of design considerations (cost, weight, size, performance capability etc.) that may influence the number and/or combination of tilt and lift propellers in a VTOL aircraft. As further described below, the number and orientation of propellers may affect propeller vibrations. Therefore, the flight control system may process sensor measurements in certain ways (e.g., those discussed in disclosed embodiments) to control the aircraft in a manner that reduces and/or removes the influence of propeller vibrations.

FIG. 9A illustrates an arrangement of electric propulsion units, consistent with embodiments of the present disclosure. Referring to FIG. 9A, the aircraft shown in the figure may be a top plan view of an exemplary aircraft (e.g., a VTOL aircraft). The aircraft may include twelve electric propulsion systems distributed across the aircraft. In some embodiments, a distribution of electric propulsion systems may include six forward electric propulsion systems (901, 902, 903, 904, 905, and 906) and six aft electric propulsion systems (907, 908, 909, 910, 911, and 912). In some embodiments, the six forward electric propulsion systems may be operatively connected to tilt propellers and the six aft electric propulsion systems may be operatively connected to lift propellers. In other embodiments, the six forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 9B illustrates an alternate arrangement of electric propulsion units, consistent with embodiments of the present disclosure. Referring to FIG. 9B, the aircraft shown in the figure may be a top plan view of an exemplary aircraft (e.g., a VTOL aircraft). The aircraft may include eight electric propulsion systems distributed across the aircraft. In some embodiments, a distribution of electric propulsion systems may include four forward electric propulsion systems (913, 914, 915, and 916) and four aft electric propulsion systems (917, 918, 919, and 920). In some embodiments, the four forward electric propulsion systems may be operatively connected to tilt propellers and the four aft electric propulsion systems may be operatively connected to lift propellers. In other embodiments, the four forward electric propulsion systems and a number of aft electric propulsion systems may be operatively connected to tilt propellers and the remaining aft electric propulsion systems may be operatively connected to lift propellers. In other embodiments, all forward and aft electric propulsion systems may be operatively coupled to tilt propellers.

FIG. 9C illustrates an alternate arrangement of electric propulsion units, consistent with embodiments of the present disclosure. Referring to FIG. 9C, the aircraft shown in the figure may be a top plan view of an exemplary aircraft (e.g., a VTOL aircraft). The aircraft may include six electric propulsion systems distributed across the aircraft. In some embodiments, a distribution of electric propulsion systems may include a first set of four electric propulsion systems 921, 922, 923, and 924 coplanar in a first plane and a second set of two electric propulsion systems 925 and 926 coplanar in a second plane. In some embodiments, the first set of electric propulsion systems 921-924 may be operatively connected to tilt propellers and second set of electric propulsion systems 925 and 926 may be operatively connected to lift propellers. In other embodiments, the first set of electric propulsion systems 921-924 and the second set of aft electric propulsion systems 925 and 926 may all be operatively connected to tilt propellers.

FIG. 9D illustrates an alternate arrangement of electric propulsion units, consistent with embodiments of the present disclosure. Referring to FIG. 9D, the aircraft shown in the figure may be a top plan view of an exemplary aircraft (e.g., a VTOL aircraft). The aircraft may include four electric propulsion systems distributed across the aircraft. In some embodiments, a distribution of electric propulsion systems may include four coplanar electric propulsion systems 927, 928, 929, and 930. In some embodiments, all of the electric propulsion systems may be operatively connected to tilt propellers.

FIG. 9E illustrates an alternate arrangement of electric propulsion units, consistent with embodiments of the present disclosure. Referring to FIG. 9E, the aircraft shown in the figure may be a top plan view of an exemplary aircraft (e.g., a VTOL aircraft). The aircraft may include six electric propulsion systems distributed across the aircraft. For example, in some embodiments, the aircraft may include four forward electric propulsion systems 931, 932, 933, and 934 operatively connected to tilt propellers and the two aft electric propulsion systems 935 and 936 operatively connected to lift propellers. In some embodiments, the aircraft may include ten electric propulsion systems distributed across the aircraft. For example, in some embodiments, the aircraft may include six forward electric propulsion systems operatively connected to tilt propellers and the four aft electric propulsion systems operatively connected to lift propellers. In some embodiments, some or all of the aft electric propulsion systems may operatively connected to tilt propellers.

As shown in FIG. 9E, in some embodiments, the aircraft may have a flying wing configuration, such as a tailless fixed-wing aircraft with no definite fuselage. In some embodiments, the aircraft may have a flying wing configuration with the fuselage integrated into the wing. In some embodiments, the tilt propellers may rotate in a plane above the body of the aircraft when the tilt propellers operate in a lift configuration.

As disclosed herein, the forward electric propulsion systems and aft electric propulsion systems may be of a clockwise (CW) type or counterclockwise (CCW) type. Some embodiments may include various forward electric propulsion systems possessing a mixture of both CW and CCW types. In some embodiments, the aft electric propulsion systems may possess a mixture of CW and CCW type systems among the aft electric propulsion systems. In some embodiments, each electric propulsion systems may be fixed as clockwise (CW) type or counterclockwise (CCW) type, while in other embodiments, one or more electric propulsion systems may vary between clockwise (CW) and counter-clockwise (CCW) rotation.

Figure 10:
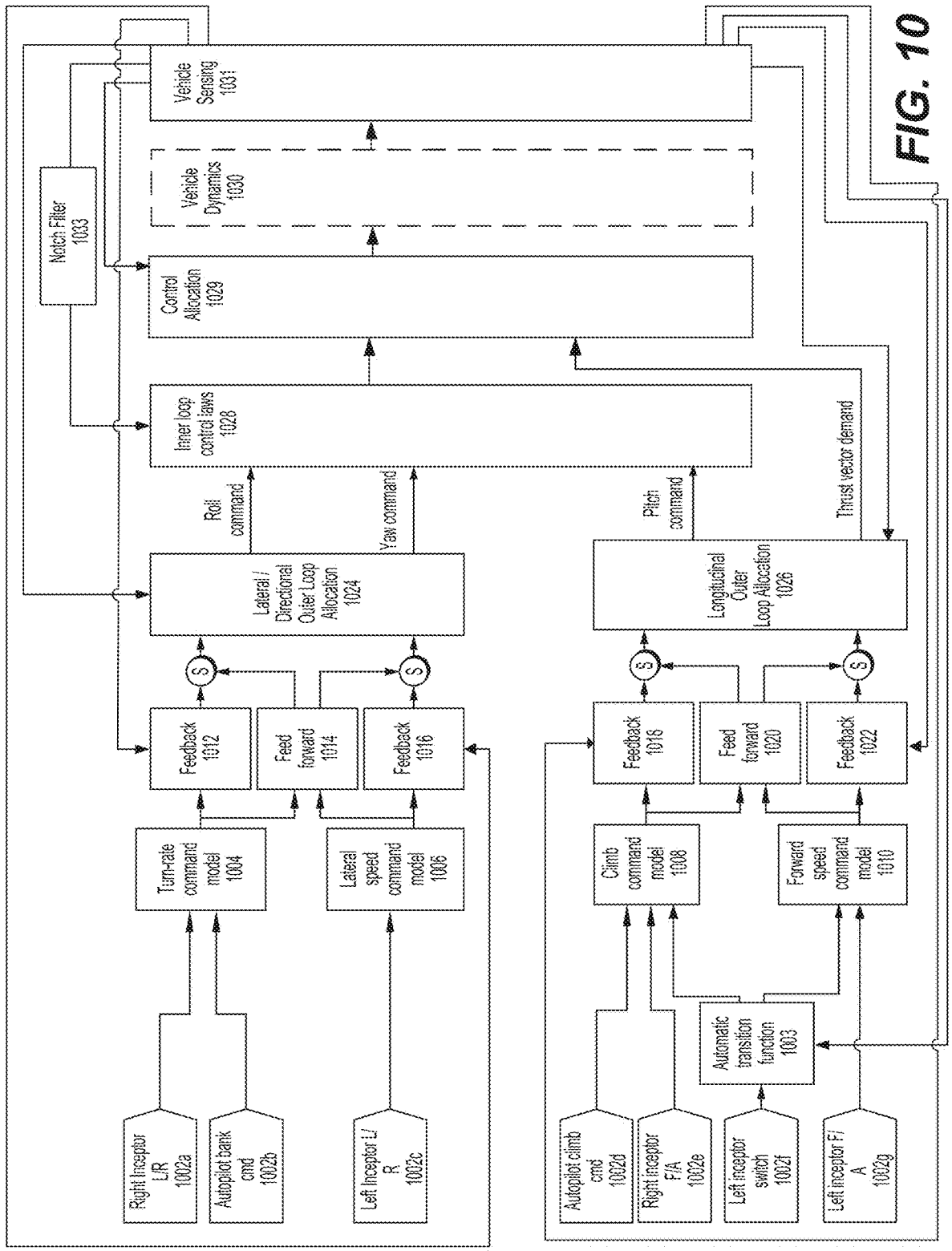
FIG. 10 illustrates a functional block diagram of an exemplary control system of an electric VTOL aircraft, consistent with disclosed embodiments.

FIG. 10 illustrates a functional block diagram of an exemplary control system 1000 of an aircraft, consistent with disclosed embodiments. System 1000 may be implemented by at least one processor (e.g., at least one microprocessor-based controller) configured to execute software code stored in a storage medium (e.g., a computer-readable medium, a non-transitory computer-readable medium) to implement the functions described herein. System 1000 may also be implemented in hardware, or a combination of hardware and software. System 1000 may be implemented as part of a flight control system of the aircraft (e.g., part of FCS 612 in FIG. 6) and may be configured to perform a single step or sequence repeatedly until a desired or commanded outcome is achieved. It is to be understood that many of conventional functions of the control system are not shown in FIG. 10 for ease of description. System 1000 further includes one or more storage mediums storing model(s), function(s), table(s), and/or any information for executing the disclosed processes. As further described below, any or each box indicating a command model (e.g., 1004, 1006, 1008, and 1010), feedback (1012, 1016, 1018, and 1022), feed forward (1014, 1020), outer loop allocation (1024, 1026), inner loop control laws 1028, control allocation 1029, and Notch Filter 1033 may represent or include module(s), script(s), function(s), application(s), and/or program(s) that are executed by processor(s) and/or microprocessor(s) of the System 1000. It is appreciated that the complexity and interconnectedness of the functional block diagram of FIG. 10 would be impossible, or at least impractical, to effectively implement by a human user, especially when considering that these functionalities are implemented while the aircraft is flying (including taking off or landing).

System 1000 may detect one or more inputs, such as from a pilot input device configured to receive at least one pilot input and generate or influence a signal. A pilot input may be generated by and/or received from an input device or mechanism of the aircraft, such as a button, a switch, a stick, a slider, an inceptor, or any other device configured to generate or influence a signal based on a physical action from a pilot. For example, a pilot input device may include one or more of right inceptor(s) (e.g., moving left/right 1002a and/or forward/aft 1002e), left inceptor(s) (e.g., moving left/right 1002c and/or forward/aft 1002g), and/or left inceptor switch 1002f. In some embodiments, a pilot input device may include an interface with an autopilot system (e.g., display screen(s), switch(es), button(s), lever(s), and/or other interface(s)). In some embodiments, system 1000 may further detect inputs from an autopilot system, such as autopilot roll command 1002b, autopilot climb command 1002d, and/or other command(s) to control the aircraft.

In some embodiments, the one or more inputs may include at least one of a position and/or rate of a right inceptor and/or a left inceptor, signals received (e.g., response type change commands, trim inputs, backup control inputs, etc.) from switches on the inceptors, measurements of aircraft state and environmental conditions (e.g., measured load factor, airspeed, roll angle, pitch angle, actuator states, battery states, aerodynamic parameters, temperature, gusts, etc.) based on data received from one or more sensors of the aircraft, obstacles (e.g., presence or absence of other aircraft and/or debris), and an aircraft mode (e.g., taxiing on the ground, takeoff, in-air). For example, right inceptor L/R 1002a may comprise a lateral position and/or rate of a right inceptor (e.g., an inceptor positioned to the right of another inceptor and/or an inceptor positioned on the right side of a pilot area), autopilot roll cmd 1002b may comprise a roll signal received in autopilot mode, left inceptor L/R 1002c may comprise a lateral position and/or rate of a left inceptor (e.g., an inceptor positioned to the left of another inceptor and/or an inceptor positioned on the left side of a pilot area), autopilot climb cmd 1002d may comprise a climb signal received in autopilot mode, right inceptor F/A 1002e may comprise a longitudinal position and/or rate of the right inceptor, left inceptor switch 1002f may comprise a signal from a switch for enabling or disabling automatic transition function 1003, and left inceptor F/A 1002g may comprise a longitudinal position and/or rate of the left inceptor. Each input may include additional data as listed above (e.g., signals from switches, measurements of aircraft state, aircraft mode, etc.). Actuator states may include actuator hardware limits, such as travel limits, speed limits, response time limits, etc., and can include actuator health indicators that may indicate deteriorations in actuator performance that may limit a given actuator's ability to satisfy actuator commands. Actuator states may be used to determine the bounds (e.g., minimum/maximum values) for individual actuator commands. Battery states may correspond to remaining energy of the battery packs of the aircraft, which may be monitored when control allocation 1029 considers balancing battery pack energy states. Aerodynamic parameters may be parameters derived from aerodynamic and acoustic modeling and can be based on the actuator Jacobian matrices and actuator states. Each input received from an inceptor may indicate a corresponding adjustment to an aircraft's heading or power output.

Command models 1004, 1006, 1008 and 1010 may be configured to determine a shape (e.g., aggressiveness, slew rate, damping, overshoot, etc.) of an ideal aircraft response. For example, each command model of command models 1004, 1006, 1008 and 1010 may be configured to receive and interpret at least one of inputs 1002a, 1002b, 1002c, 1002d, 1002e, 1002f and 1002g and, in response, compute a corresponding change to an aircraft's orientation, heading, and propulsion, or a combination thereof using an integrator (not pictured). In some embodiments, right inceptor L/R 1002a and autopilot roll cmd 1002b may be fed into turn-rate command model 1004, left inceptor L/R 1002c may be fed into lateral speed command model 1006, autopilot climb cmd 1002d and right inceptor F/A 1002e may be fed into climb command model 1008, and left inceptor F/A 1002g may be fed into forward speed command model 1010. In some embodiments, an output from automatic transition function 1003 may be fed into at least one of climb command model 1008 or forward speed command model 1010. For example, based on receiving an enable signal from left inceptor switch 1002f, automatic transition function 1003 may automatically determine at least one of a climb signal or a forward speed signal for transmission to at least one of climb command model 1008 or forward speed command model 1010.

Turn-rate command model 1004 may be configured to output a desired position and/or turn-rate command and may also be configured to compute a desired heading of the aircraft to be assumed when the inceptor is brought back to a centered position (i.e., in detent). Lateral speed command model 1006 may be configured to output a desired position and/or lateral speed command. Climb command model 1008 may be configured to output at least one of a desired altitude, vertical speed, or vertical acceleration command. Forward speed command model 1010 may be configured to output at least one of a desired position, longitudinal speed, or longitudinal acceleration command. In some embodiments, one or more of the command models may be configured to output an acceleration generated in response to changes in speed command. For example, climb command model 1008 may be configured to output a vertical acceleration generated in response to a change in vertical speed command.

Feed forward 1014 and 1020 may each receive as input one or more desired changes (e.g., desired position, speed and/or acceleration) from corresponding command models 1004, 1006, 1008 or 1010 as well as data received from the one or more aircraft sensors (e.g., airspeed, vehicle orientation, vehicle load factor, measured acceleration, vehicle mass and inertia, air density, altitude, aircraft mode, etc.) and may be configured to output, for each desired change, a corresponding force to accomplish the desired change. In some embodiments, feed forward 1014 and 1020 may be configured to determine the corresponding force using simplified models of aircraft dynamics. For example, based on a known (e.g., a stored value of) or determined mass of the aircraft, feed forward 1014 and 1020 may be configured to determine a force to cause the aircraft to follow a desired acceleration command. In some embodiments, feed forward 1014 and 1020 may be configured to use a model predicting an amount of drag on the vehicle produced as a function of speed in order to determine a force required to follow a desired speed command signal.

Feedback 1012, 1016, 1018, and 1022 may each receive as input the one or more desired changes (e.g., desired position, speed and/or acceleration) from command models 1004, 1006, 1008 and 1010 as well as data received from Vehicle Sensing 1031 indicating vehicle dynamics 1030. For example, sensed vehicle dynamics 1030 may comprise the physics and/or natural dynamics of the aircraft, and Vehicle Dynamics Sensing 1031 sensor measurements may capture how the aircraft moves in response to pilot inputs, propulsion system outputs or ambient conditions. Additionally or alternatively, data received from Vehicle Sensing 1031 may include error signals generated, by one or more processors, based on exogenous disturbances (e.g., gust causing speed disturbance). In some embodiments, feedback 1012, 1016, 1018 and 1022 may be configured to generate feedback forces (e.g., at an actuator) based on the received error signals. For example, feedback 1012, 1016, 1018 and 1022 may generate feedback forces with the intent of counteracting the effect(s) of external disturbances. Additionally or alternatively, feedback 1012, 1016, 1018 and 1022 may be configured to generate feedback forces based on modeling errors. For example, if an incorrect aircraft mass is input into either feed forward 1014 or 1020, the aircraft may accelerate faster or slower than the desired change. Based on determining a difference between the desired acceleration and the measured acceleration, one or more processors may generate an error signal (e.g., included in vehicle sensing 1031) which may be looped into feedback 1012, 1016, 1018 or 1022 to determine an additional force needed to correct the error.

In some embodiments, feedback 1012, 1016, 1018 or 1022 may be disabled. For example, in response to losing position and/or ground speed feedback due to disruption of global position system (GPS) communication, system 1000 may be configured to operate without feedback 1012, 1016, 1018 or 1022 until GPS communication is reconnected.

In some embodiments, feedback 1012, 1016, 1018 or 1022 may receive as input a plurality of measurements as well as a trust value for each measurement indicating whether the measurement is valid. For example, one or more processors of system 1000 may assign a Boolean (true/false) value for each measurement used in system 1000 to indicate that the measurement is trustworthy (e.g., yes) or that the measurement may be invalid (e.g., no). Based on one or more processors identifying a measurement as invalid, feedback 1012, 1016, 1018 or 1022 may omit that measurement for further processing. For example, in response to one or more processors identifying a heading measurement as invalid, feedback 1012, 1016, 1018 or 1022 may omit subsequent heading measurements in determining feedback force(s).

In some embodiments, feedback 1012, 1016, 1018 or 1022 may determine one or more feedback forces based on actuator state information received from one or more sensors (e.g., included in vehicle sensing 1031). For example, in response to actuator state information indicating that there is a failure of an actuator, one or more processors of system 1000 may update one or more processes of System 1000 and determine an alternative command to achieve the desired change. For example, one or more processors of system 1000 may adjust one or more model(s), function(s), algorithm(s), table(s), input(s), parameter(s), threshold(s), and/or constraint(s) in response to the failure of an actuator. Alternative command(s) (e.g., yaw, pitch, roll, thrust, or torque) may be determined based on the adjustment(s). Additionally or alternatively, in response to actuator state information indicating that one or more actuators are at a maximum value, one or more processors of system 1000 may update one or more processes of system 1000 (e.g., as described above) and determine an alternative command to achieve the desired change.

Total desired forces may be calculated based on outputs of feedback 1012, 1016, 1018 and 1022 and feed forward 1014 and 1020. For example, one or more processors of system 1000 may calculate a desired turn-rate force by summing the outputs of feedback 1012 and feed forward 1014. Additionally or alternatively, one or more processors of system 1000 may calculate a desired lateral force by summing the outputs of feedback 1016 and feed forward 1014. Additionally or alternatively, one or more processors of system 1000 may calculate a desired vertical force by summing the outputs of feedback 1018 and feed forward 1020. Additionally or alternatively, one or more processors of system 1000 may calculate a desired longitudinal force by summing the outputs of feedback 1022 and feed forward 1020.

Lateral/Directional Outer Loop Allocation 1024 and Longitudinal Outer Loop Allocation 1026 may each be configured to receive as input one or more desired forces and data received from the one or more aircraft sensors (e.g., airspeed, vehicle orientation, vehicle load factor, measured acceleration, vehicle mass and inertia, indications of working/failed actuators, air density, altitude, aircraft mode, whether the aircraft is in the air or on ground (e.g., weight on wheels etc.). Based on the inputs, Outer Loop Allocations 1024 and 1026 may be configured to command roll, command yaw, command pitch, demand thrust, or output a combination of different commands/demands in order to achieve the one or more desired forces.

Lateral/Directional Outer Loop Allocation 1024 may receive as input a desired turn-rate force and/or a desired lateral force and may command roll or command yaw. In some embodiments, Lateral/Directional Outer Loop Allocation 1024 may determine output based on a determined flight mode. A flight mode may be determined using pilot inputs (e.g., a selected mode on an inceptor) and/or sensed aircraft information (e.g., an airspeed). For example, Lateral/Directional Outer Loop Allocation 1024 may determine a flight mode of the aircraft using at least one of a determined (e.g., sensed or measured) airspeed or an input received at a pilot inceptor button (e.g., an input instructing the aircraft to fly according to a particular flight mode). In some embodiments, Lateral/Directional Outer Loop Allocation 1024 may be configured to prioritize a pilot inceptor button input over measured airspeed in determining the flight mode (e.g., the pilot inceptor button is associated with a stronger weight or higher priority than a measured airspeed). In some embodiments, Lateral/Directional Outer Loop Allocation 1024 may be configured to blend (e.g., using weighted summation) the determined airspeed and pilot inceptor button input to determine the flight mode of the aircraft. In a hover flight mode, Lateral/Directional Outer Loop Allocation 1024 may achieve the desired lateral force with a roll command (e.g., roll angle, roll rate) and may achieve the desired turn-rate force with a yaw command. In some embodiments, such as in hover flight mode, the aircraft may be configured to not be able to accelerate outside a predetermined hover envelope (i.e., hover speed range). In a forward-flight mode (e.g., horizontal flight), Lateral/Directional Outer Loop Allocation 1024 may achieve the desired lateral force with a yaw command and may achieve the desired turn-rate force with a roll command. In forward flight mode, Lateral/Directional Outer Loop Allocation 1024 may be configured to determine output based on sensed airspeed. In a transition between hover flight mode and forward flight mode, Lateral/Directional Outer Loop Allocation 1024 may achieve desired forces using a combination of a roll command and a yaw command.

Longitudinal Outer Loop Allocation 1026 may receive as input a desired vertical force and/or a desired longitudinal force and may output at least one of a pitch command (i.e., pitch angle) or a thrust vector demand. A thrust vector demand may include longitudinal thrust (i.e., mix of nacelle tilt and front propeller thrust) and vertical thrust (i.e., combined front and rear thrust). In some embodiments, Longitudinal Outer Loop Allocation 1026 may determine output based on a determined flight mode. For example, in a hover flight mode, Longitudinal Outer Loop Allocation 1026 may achieve a desired longitudinal force by lowering a pitch attitude and by using longitudinal thrust, and may achieve a desired vertical force with vertical thrust. In a forward-flight mode, Longitudinal Outer Loop Allocation 1026 may achieve a desired longitudinal force with longitudinal thrust (e.g., front propeller thrust). In a cruise flight mode, Longitudinal Outer Loop Allocation 1026 may achieve a desired vertical force by commanding pitch (e.g., raising pitch attitude) and demanding thrust (e.g., increasing longitudinal thrust).

Inner loop control laws 1028 may be configured to determine moment commands based on at least one of a roll command, yaw command, or pitch command from Lateral/Directional Outer Loop Allocation 1024 or Longitudinal Outer Loop Allocation 1026. In some embodiments, Inner loop control laws 1028 may be dependent on sensed vehicle dynamics (e.g., from Vehicle Sensing 1031). For example, Inner loop control laws 1028 may be configured to compensate for disturbances at the attitude and rate level in order to stabilize the aircraft. Additionally or alternatively, Inner loop control laws 1028 may consider periods of natural modes (e.g., phugoid modes) that affect the pitch axis, and may control the aircraft appropriately to compensate for such natural modes of the vehicle. In some embodiments, inner loop control laws 1028 may be dependent on vehicle inertia.

Inner loop control laws 1028 may determine moment commands using one or more stored dynamics models that reflect the motion characteristics of the aircraft (e.g., the aerodynamic damping and/or inertia of the aircraft). In some embodiments, the Inner loop control laws 1028 may use a dynamic model (e.g., a low order equivalent system model) to capture the motion characteristics of the aircraft and determine one or more moments that will cause the aircraft to achieve the commanded roll, yaw, and/or pitch. Some embodiments may include determining (e.g., by inner loop control laws 1028 or other component) a moment command based on at least one received command (e.g., a roll command, yaw command, and/or pitch command) and a determined (e.g., measured) aircraft state. For example, a moment command may be determined using a difference in the commanded aircraft state and the measured aircraft state. By way of further example, a moment command may be determined using the difference between a commanded roll angle and a measured roll angle. As described below, Control Allocation 1029 may control the aircraft (e.g., through flight elements) based on the determined moment command. For example, Control Allocation 1029 may control (e.g., transmit one or more commands to) one or more electric propulsion system(s) of the aircraft (e.g., electric propulsion system 602 shown in FIG. 6), including tilt actuator(s), electric engine(s), and/or propeller(s). Control Allocation 1029 may further control one or more control surface(s) of the aircraft (e.g., control surfaces 712 and 714 shown in FIG. 7), including flaperon(s), ruddervator(s), aileron(s), spoiler(s), rudder(s), and/or elevator(s). Vehicle dynamics 1030 represents the controlled flight elements (e.g., electric propulsion system(s) and/or control surfaces) and aircraft dynamics.

While the embodiment shown in FIG. 10 includes both Inner loop control laws 1028 and Outer loop allocation 1024 and 1026, in some embodiments the flight control system may not include Outer loop allocation 1024 and 1026. Therefore, a pilot inceptor input may create roll, yaw, pitch, and/or thrust commands. For example, a right inceptor may control roll and pitch and a left inceptor and/or pedal(s) may control yaw and thrust.

Control allocation 1029 may accept as inputs one or more of force and moment commands, data received from the one or more aircraft sensors, envelope protection limits, scheduling parameter, and optimizer parameters. control allocation 1029 may be configured to determine, based on the inputs, actuator commands by minimizing an objective function that includes one or more primary objectives, such as meeting commanded aircraft forces and moments, and one or more secondary, which can include minimizing acoustic noise and/or optimizing battery pack usage.

In some embodiments, control allocation 1029 may be configured to compute the limits of individual actuator commands based on the actuator states and envelope protection limits. In normal operation, the minimum command limit for a given actuator includes the maximum of: the minimum hardware based limit and the minimum flight envelope limit; and the maximum command limit for a given actuator includes the minimum of: the maximum hardware based limit and the maximum flight envelope limit. In the case of an actuator failure, the command limits for the failed actuator correspond to the failure mode.

Control allocation 1029 sends commands to one or more flight elements to control the aircraft. The flight elements will move in accordance with the controlled command. Various sensing systems and associated sensors as part of Vehicle Dynamic Sensing 1031 may detect the movement of the flight elements and/or the dynamics of the aircraft and provide the information to Feedback 1012, 1016, 1018, 1022, Outer Loop allocation 1024 and 1026, Inner Loop Control laws 1028, and Control Allocation 1029 to be incorporated into flight control.

As described above, Vehicle Sensing 1031 may include one or more sensors to detect vehicle dynamics. For example, Vehicle Sensing 1031 may capture how the aircraft moves in response to pilot inputs, propulsion system outputs or ambient conditions. Additionally or alternatively, Vehicle Sensing 1031 may detect an error in the aircraft's response based on exogenous disturbances (e.g., gust causing speed disturbance). Further, Vehicle Sensing 1031 may include one or more propeller speed sensors, such as a magnetic sensor(s) (e.g., Hall effect or inductive sensor) and/or optical sensor(s) (e.g., a tachometer) to detect the rotor speed of the aircraft engine (and thereby the speed of the propeller). Vehicle Sensing 1031 may include one or more sensors to detect a nacelle tilt angle (e.g., a propeller rotation axis angle between a lift configuration (e.g., FIG. 2) and forward thrust configuration (e.g., FIG. 1)). For example, one or more magnetic sensors (e.g., Hall effect or inductive sensor), position displacement sensors, linear displacement sensors, and/or other sensor(s) associated with the tilt actuator may detect a tilt angle (e.g., relative to the aircraft and/or wing), which may be provided to system 1000. Further, one or more pitot tubes, accelerometers, and/or gyroscopes may detect a pitch angle of the aircraft, which may be provided to system 1000. In some embodiments, Vehicle Sensing 1031 may combine tilt angle sensor measurements and aircraft pitch measurements to determine an overall nacelle tilt angle for the propellers. Vehicle Sensing 1031 may include one or more sensors configured to detect an engine torque and/or thrust, such as one or more current sensors or voltage sensors, strain gauges, load cells, and/or propeller vibration sensors (e.g., accelerometers).

Vehicle Sensing 1031 may include one or more sensors configured to detect vehicle dynamics, such as acceleration and/or pitch orientation sensors (e.g., accelerometer(s), 3-axis accelerometer(s), gyroscope(s), and/or 3-axis gyroscope(s)) and airspeed sensors (e.g., pitot tube sensors). Vehicle Sensing 1031 may further include one or more inertial measurement units (IMUs) to determine an aircraft state based on these measurements. An aircraft state may refer to forces experienced by, an orientation of, a position of (e.g., altitude), and/or movement of, the aircraft. For example, an aircraft state may include at least one of: a position of the aircraft (e.g., a yaw angle, roll angle, pitch angle, and/or any other orientation across one or two axes), velocity of the aircraft, angular rate of the aircraft (e.g., roll, pitch, and/or yaw rate), and/or an acceleration of the aircraft (e.g., longitudinal, lateral and/or vertical acceleration), or any physical characteristic of the aircraft or one of its components. In some embodiments, Vehicle Sensing 1031 may include an inertial navigation systems (INS) and/or an air data and/or an attitude heading reference systems (ADAHRS). The inertial navigation systems (INS) and/or an air data and attitude heading reference systems (ADAHRS) may include one or more inertial measurement units (IMUs) and corresponding sensors (e.g., accelerometers, gyroscopes, three-axis gyroscopes, and/or three-axis accelerometers). In some embodiments, the INS and/or ADAHRS may filter and/or otherwise process sensor measurements to determine an aircraft state (e.g., acceleration or angular rate). For example, in some embodiments, the INS and/or ADAHRS may determine angular rates based on gyroscope measurements and may determine acceleration based on measurements from an accelerometer.

Movable Notch Filter 1033 attenuates and/or filters out the effects of vibration on measurements to avoid sending these measurements to the control law and sending high frequency commands (e.g., command signals with frequencies above a particular threshold) to the flight elements (propellers, tilt actuators, flight control surface actuators, electric engines, etc.). In some embodiments, as further described below, Movable Notch Filter 1033 may attenuate and/or filter out the effects of vibration on measurements from one or more IMUs and corresponding sensors before these measurements are input into Inner Loop Control laws 1028 and affect control of flight elements. The disclosed embodiments lessen the influence of propeller vibrations on aircraft control signals.

Figure 11:
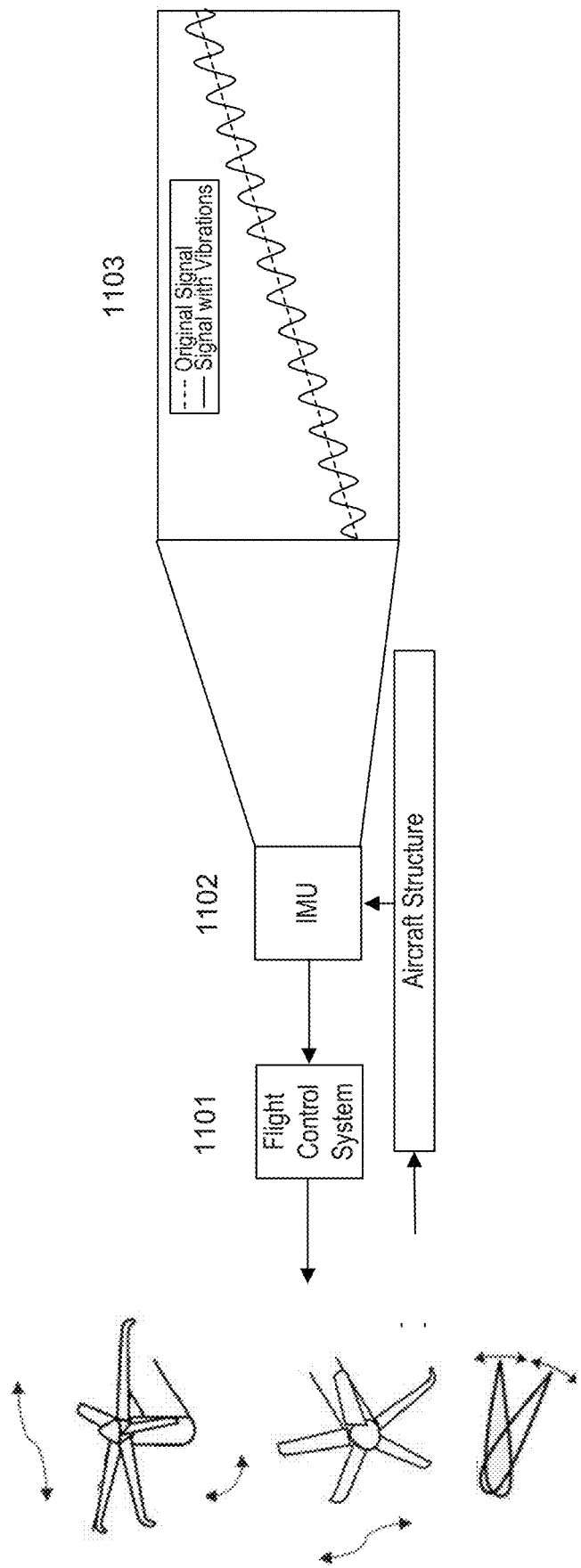
FIG. 11 illustrates effects of vibrations on a signal, consistent with disclosed embodiments.

FIG. 11 illustrates effects of vibrations on a signal, consistent with disclosed embodiments. As the propeller rotates it may generate significant vibrations at multiple frequencies proportional to the propeller rotational speed. These vibrations 1103 may be conducted through an engine and aircraft structure to an inertial measurement unit (IMU) 1102 (e.g., an IMU and corresponding accelerometer(s) in Vehicle Sensing 1031). The vibrations 1103 may corrupt the vehicle's state estimate based on IMU measurements, and may feed through to the flight control system 1101, resulting in high-frequency commands to flight elements 1104. As described above, these high frequency commands may result in increased power consumption, increased aircraft component temperatures, increased aircraft component cycles and wear, and may contribute to increased cabin and community noise, as well as decreased ride quality.

Figure 12:
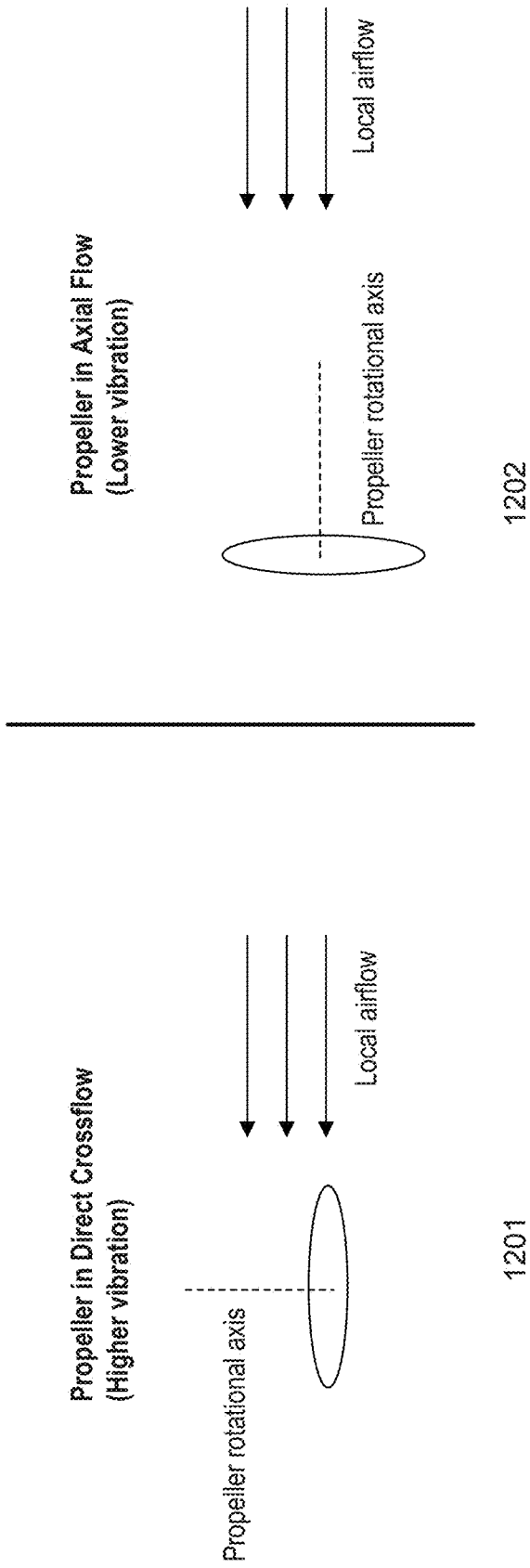
FIG. 12 illustrates a scenario where vibrations may be more significant due to edgewise airflow, consistent with disclosed embodiments.

FIG. 12 illustrates a scenario where vibrations may be more significant, consistent with disclosed embodiments. Vibrations may be particularly strong and of a more disruptive frequency on two and three-bladed propellers, such as those used on one or more of the aft or lifter propellers of the aircraft in some embodiments of the present disclosure. Further, vibrations may be particularly strong when propellers are oriented in edgewise air flow as shown at 1201, such as when the rotation axis is perpendicular to the aircraft's trajectory. Vibrations may be less strong when propellers are oriented parallel to air flow as shown at 1202, such as when the rotation axis is parallel to the aircraft's trajectory. Therefore, any aircraft detailed in FIGS. 9A-9E above that include propellers oriented to experience edgewise air flow may be particularly susceptible to propeller vibrations. However, any aircraft with propellers may implement the present disclosure and would see benefits in doing so.

Figure 13A:
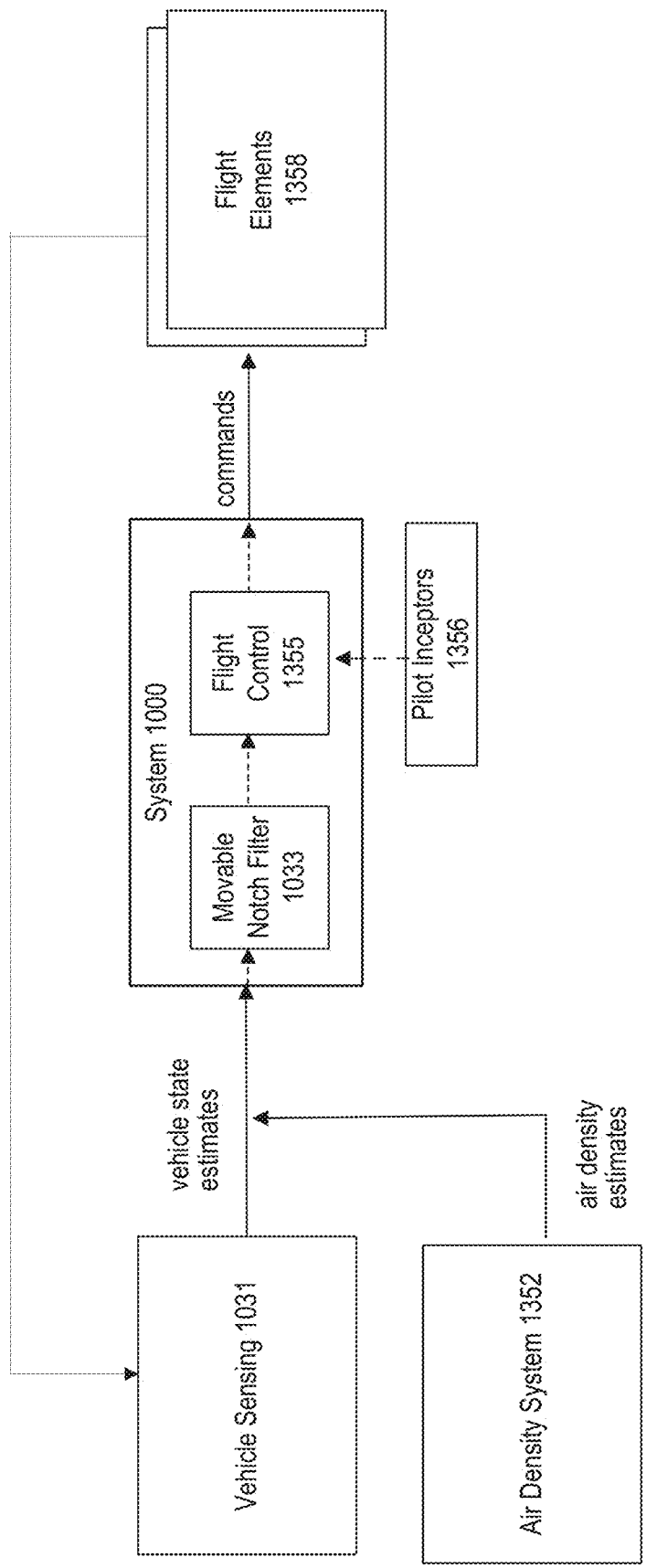
FIG. 13A illustrates a block diagram of an exemplary flight control architecture, consistent with disclosed embodiments.

FIG. 13A illustrates a block diagram of an exemplary flight control, consistent with disclosed embodiments. Vehicle Sensing 1031 may include at least one processor, at least one memory, and/or one or more sensors to estimate aircraft dynamics. For example, Vehicle Sensing 1031 may receive data (e.g., first sensor data) from one or more inertial measurement units and/or corresponding sensors (e.g., accelerometer and/or gyroscope) and based on this information determine a position of the aircraft (e.g., an orientation), velocity of the aircraft, angular rate of the aircraft (e.g., roll, pitch, and/or yaw rate), and/or an acceleration of the aircraft (e.g., longitudinal, lateral and/or vertical acceleration). Further, Vehicle Sensing 1031 may receive data from a tilt angle sensor and determine a tilt angle of at least one propeller (e.g., a propeller angle), indicating a propeller rotation axis angle between a lift configuration (e.g., FIG. 2) and forward thrust configuration (e.g., FIG. 1)), such as a magnetic sensor (e.g., Hall effect or inductive sensor). Further, Vehicle Sensing 1031 may receive data (e.g., second sensor data) from airspeed sensors (e.g., pitot tube pressure sensor) and determine an airspeed of the aircraft. Air Data System 1352 may include at least one processor, at least one memory, and one or more sensors to estimate information on air conditions. For example, Air Data System 1352 may estimate an air density from at least one air density sensor configured to measure an air density (e.g., a pressure sensor and temperature sensor).

As described above, System 1000 may include at least one processor and at least one memory to receive pilot inceptor input, navigation input, sensor information (e.g., reflective of flight dynamics or flight conditions), determine control signals according to aircraft control laws and allocation, and/or send control signals to control the flight elements (e.g., control surfaces, propellers, tilt actuators, electric engines, batteries, etc.). Movable Notch Filter 1033 may include at least one processor and at least one memory. In some embodiments, Movable Notch Filter 1033 may be part of the flight control system (e.g., part of an FCC), while in other embodiments Movable Notch Filter 1033 may be separate. In some embodiments, Movable Notch Filter 1033 may receive the estimates from Vehicle Sensing 1031 and Air Data System 1352. In some embodiments, Movable Notch Filter 1033 may receive information directly from one or more of the sensors (e.g., accelerometers, gyroscopes, tilt angle sensors, airspeed sensors, and/or air density sensors).

In some embodiments, based on the measured air density and measured airspeed, Movable Notch Filter 1033 may determine a propeller speed of at least one propeller, based on a predetermined propeller speed and predetermined air density at the measured airspeed. For example, the propeller speed of at least one propeller (e.g., each of the propellers of an aircraft) may be determined based on the predetermined propeller speed and predetermined air density at sea level for the measured airspeed. The predetermined propeller speed and predetermined air density at sea level may be determined prior to flight based on propeller speed and/or air density measurements taken in flight at sea level at the measured airspeed (e.g., corresponding to the measured airspeed) and/or by modeling propeller speed and/or air density at sea level at the measured airspeed. For example, $$\Omega_{determine} = \Omega_{sea\ level} \sqrt{\frac{\rho_{sea\ level}}{\rho_{measured}}}; \Omega\_(sea\ level) = f(V_{airspeed}).$$

As further described below, in some embodiments, the predetermined propeller speed at sea level may be an average predetermined propeller speed for all propellers, an average predetermined propeller speed for a group of propellers (e.g., all fore propellers, all aft propellers), or an average predetermined propeller speed for each individual propeller. While the predetermined propeller speed and air density at sea level is used here, in other embodiments any predetermined combination of propeller speed and air density for a given airspeed may be used to determine the propeller speed.

In some embodiments, as further detailed below, Movable Notch Filter 1033 may instead of or in addition to using a predetermined propeller speed, determine a propeller speed based on measurements from a propeller speed sensor. For example, Movable Notch Filter 1033 may receive a propeller speed from a magnetic sensor(s) (e.g., Hall effect or inductive sensor) and/or optical sensor(s) (e.g., a tachometer) to detect the rotor speed of the aircraft engine (and thereby the speed of the propeller). By measuring propeller speed via a propeller speed sensor, Movable Notch Filter 1033 may ensure that an accurate propeller speed is determined even when the propeller is not behaving as commanded and/or expected. Therefore, the determined filter parameters (e.g., center frequency ω_0) will be more reliable because they are based on accurate propeller speed(s).

Based on the determined propeller speed and/or the airspeed, Movable Notch Filter 1033 may use one or more models, tables, and/or algorithms to determine parameters for the filter, including parameters for a center frequency wo, attenuation (depth) G, and/or width ζ of the filter. In some embodiments, the filter is a notch filter configured to attenuate the measurements across a particular range of frequencies, while in other embodiments a filter with different characteristics may be employed depending on the vibration characteristics of the aircraft's propellers. By using the propeller speed and airspeed to determine the filter parameters, which may be done in lieu of examining the characteristics of the vehicle state sensor measurements (e.g., accelerometer data) and/or estimates, Movable Notch Filter 1033 avoids inadvertently adjusting the filter based on the influence of other sources (e.g., other vibrations and/or unexpected aircraft movement). Therefore, Movable Notch Filter 1033 may avoid applying an improper filter which may attenuate and/or remove accurate vehicle state information. The determined filter parameter(s) are more predictable, easier to verify through simulated testing, and more accurately attenuate and/or filter out the effects of propeller vibration. Movable Notch Filter 1033 may receive measurements (e.g., sensor values) and/or determine filter parameters continually (e.g., while the aircraft is in flight, in real time), thereby constantly improving signals of the aircraft.

In some embodiments, the airspeed represents edgewise airflow experienced by propellers. In some embodiments, the angle of the propeller's rotation axis relative to the vehicle trajectory is also considered when determining the edgewise airflow (e.g., via a tilt angle sensor). Therefore, in some embodiments, the Movable Notch Filter 1033 may determine the filter parameters based on one or more of propeller speed(s), airspeed, or tilt angle(s) of at least one propeller.

Center Frequency As described above, the strongest vibrations may occur at N/rev frequencies, and their multiples, where N is a number of propeller blades. In some embodiments, the filter center frequency wo may be placed on the N/rev frequencies and its multiples.

$$f_{\frac{N}{rev}} = \frac{N\Omega}{60};$$

$f$|frequency(rad/s), $N$|number of propeller blades, $\Omega$|propeller speed.

For example, Movable Notch Filter 1033 may place a filter at a frequencies of $$\frac{2\Omega}{60}$$

and $$\frac{4\Omega}{60}$$

etc. for a two blade propeller and $$\frac{3\Omega}{60}$$

and $$\frac{6\Omega}{60}$$

etc. for a three blade propeller.

In some embodiments, the filter center frequency wo may be placed on the 1/rev frequencies and its multiples. For example, Movable Notch Filter 1033 may place filters at frequencies of $$\frac{1\Omega}{60}, \frac{2\Omega}{60},$$

and $$\frac{3\Omega}{60}$$

etc. In some embodiments, filters placed on the 1/rev frequencies that do not correspond to an N/rev frequency will have a smaller attenuation (depth) G and/or width ζ because the vibrations at those frequencies are not as strong as the N/rev frequencies.

Center Frequency Determination with Aliasing: In some embodiments, certain IMU measurements are affected by an aliasing effect due to the sampling rate (e.g., of flight control system). Therefore, applying the notch filter at a frequency above the Nyquist frequency, $$f_{nyquist} = \frac{f_{fcs}}{2},$$

where $f_{fcs}$ is the frequency of execution of the flight control software, may involve adjusting the center of frequency of the filter to appropriately attenuate and/or remove the effects of propeller vibration. Instead of applying the filter(s) at $$f_{\frac{N}{rev}}$$

and/or $$f_{\frac{1}{rev}}$$

(and corresponding multiples), the filter may be applied at a center frequency $$f_{folded} = \left| f_{actual} - \left( f_{fcs} \cdot \text{round}\left(\frac{f_{actual}}{f_{fcs}}\right) \right) \right|;$$

where $f_{actual}$ may correspond to $$f_{\frac{N}{rev}}, f_{\frac{1}{rev}},$$

and/or multiples of these frequencies.

Attenuation: The strength of vibrations may be a function of propeller speed and/or edgewise airflow. At a higher propeller speed and/or edgewise airflow, greater vibrations will be experienced. In some embodiments, Movable Notch Filter 1033 may dynamically adjust the attenuation G based on the propeller speed and/or edgewise airflow, as further detailed below. A filter with a larger attenuation G may be applied where larger vibrations are expected based on propeller speed(s) and/or edgewise airflow to attenuate and/or remove the effects of the larger vibrations. A filter with smaller attenuation G may be applied where smaller vibrations are expected based on propeller speed(s) and/or edgewise airflow to attenuate and/or remove the effects of the smaller vibrations. As further detailed below, models, tables, and/or algorithms may be used to determine the attenuation of the filter.

Width: Movable Notch Filter 1033 may also dynamically adjust the width ζ of the notch filter. In some embodiments, the Movable Notch Filter 1033 may adjust the width ζ of the notch filter based on a variation in propeller speed(s), propeller speed(s), and/or edgewise airflow. Movable Notch Filter 1033 may set a larger width ζ for the filter when the propellers are in a phase of flight where more variation in propeller speeds is expected between propellers. As described above, the effects of propeller vibrations are most significant at frequencies proportional to propeller rotation speed (e.g., N/rev). Therefore, a notch filter with a larger width ζ may better filter the varying effects of vibration when propellers rotate at different speeds. For example, in some embodiments, Movable Notch Filter 1033 may increase a width ζ for the filter when the aircraft is at lower airspeeds (e.g., airspeeds below a particular threshold, such as hover speeds described with respect to FIG. 16) because the propeller rotation speeds have greater variation at lower airspeeds. Further, Movable Notch Filter 1033 may set a smaller width ζ for the notch filter when the propellers are in a phase of flight where less variation in propeller speeds is expected between propellers. For example, in some embodiments, Movable Notch Filter 1033 may set a smaller width ζ for the notch filter at higher airspeeds because the propeller rotation speeds have less variation at higher airspeeds.

In some embodiments, Movable Notch Filter 1033 may adjust the width ζ based on the propeller speed and edgewise airflow, as further detailed below. At frequencies proportional to propeller rotation speed (e.g., $$\left(\text{e.g., } f_{\frac{N}{rev}} = \frac{N\Omega}{60}\right)$$

and/or when the aircraft is experiencing edgewise airflow, the vibration effects may carry over into a larger range of frequencies than when the aircraft is not experiencing edgewise airflow. Therefore, a filter with a larger width ζ may be applied where the effects of vibrations spread over a larger range of frequencies based on propeller speeds and edgewise airflow to effectively attenuate and/or remove the effects of vibration at all affected frequencies. At other frequencies and/or when the aircraft is experiencing less edgewise airflow (e.g., edgewise airflow below a particular threshold), vibrations may be localized to a smaller frequency range. Therefore, a filter with a smaller width ζ may be applied where vibrations are expected over a smaller range of frequencies, to avoid filtering signals not effected by vibrations. As further detailed below, models, tables, and/or algorithms may be used to determine the width of the filter.

Filter Determination Based on Parameters: As described above, the center of frequency for the filter may be determined at $$f_{\frac{N}{rev}}, f_{\frac{1}{rev}},$$

and/or at an adjusted frequency above the nyquist frequency. As described above, models, tables, and/or algorithms may be used to determine the attenuation and/or width parameters of the filter based on the propeller speed(s) and/or edgewise airflow. For example, in some embodiments, an attenuation parameter and width parameters may each be weighted and each weight values may change based on propeller speed and/or edgewise airflow. Further, the weight values may be determined from one or more algorithms, tables, and/or models that represent the effects of propeller vibrations based on propeller speeds and/or edgewise airflow (e.g., from modeling and/or onboard data captured over the range of expected flight conditions).

Movable Notch Filter 1033 may apply a filter based on the determined parameters. In some embodiments, this may involve inputting the parameters into an algorithm, such as a continuous-time transfer function to determine the filter magnitude at each frequency. For example, a continuous-time transfer function may be defined as follows:

$$H(s) = \frac{s^2 + 2G\zeta\omega_0 s + \omega_0^2}{s^2 + 2\zeta\omega_0 s + \omega_0};$$

G|attenuation; ζ|width; $\omega_0$|center frequency; s|frequency

Stopband Edge(s): Stopbands refer to a band of frequencies where a filter is applied. In some embodiments, Movable Notch Filter 1033 may apply a lower stopband edge, such that measurements at frequencies lower than the lower stopband edge are not filtered and measurements at frequencies higher than the lower stopband edge are filtered. Movable Notch Filter 1033 may set the lower stopband edge at a frequency value that ensures IMU signals reflective of aircraft dynamics are not filtered. Therefore, the filter may be configured to avoid destabilizing phase loss at lower frequencies.

Further, in some embodiments, Movable Notch Filter 1033 may apply a higher stopband edge where measurements at frequencies higher than the higher stopband edge are not filtered and measurements at frequencies lower than the higher stopband edge are not filtered. Movable Notch Filter 1033 may place the higher stopband edge at a frequency value lower than the Nyquist frequency.

Figure 15:
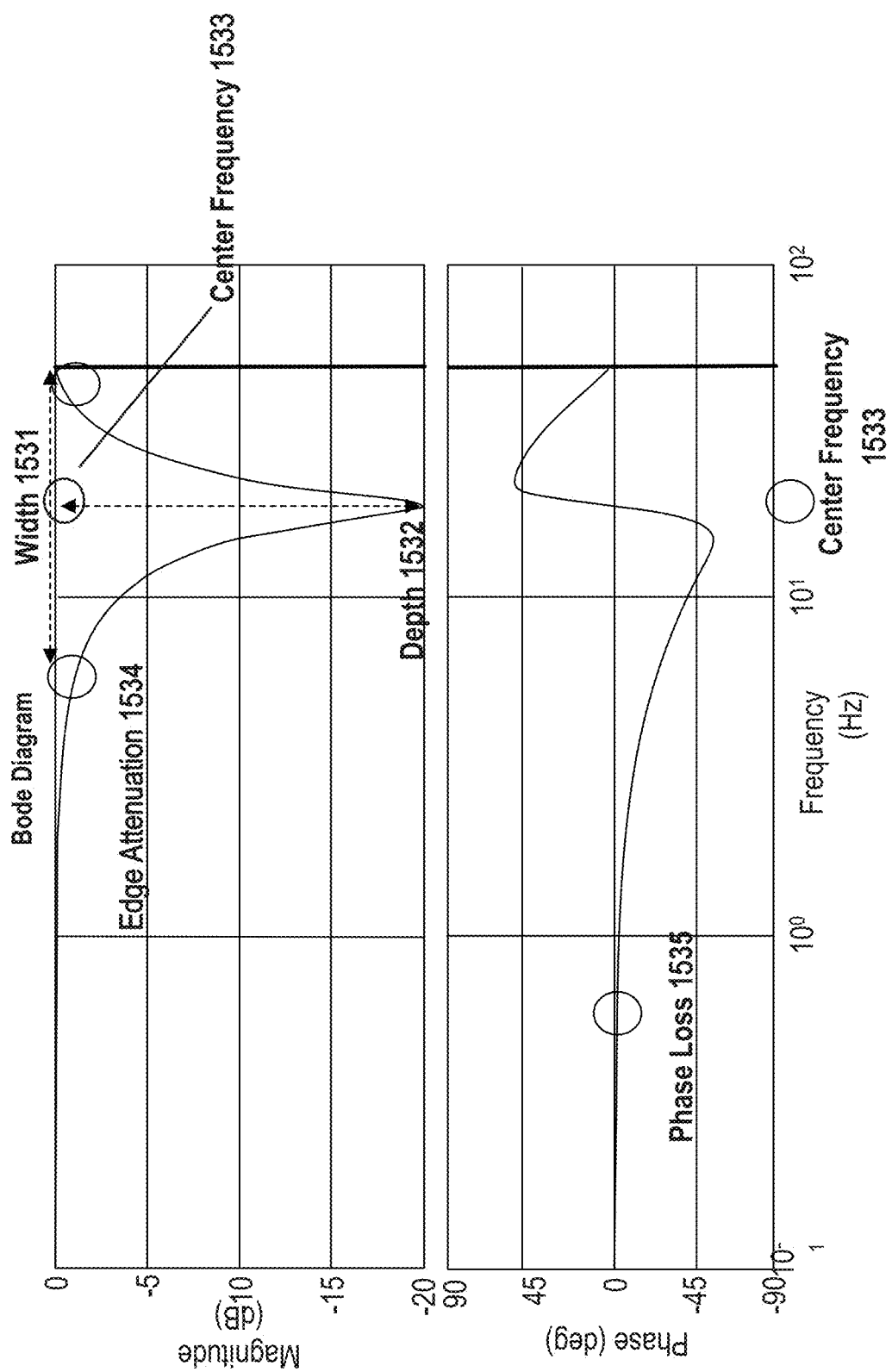
FIG. 15 illustrates a notch filter, consistent with disclosed embodiments.

In some embodiments, stopbands may be applied as a second-order filter that adjusts the filter characteristics of a first filter (e.g., an example of a first filter is shown in FIG. 15, described below). For example, by applying the stopband, the filter's attenuation may be adjusted to slope to zero at the stopband edge(s). In some embodiments, the characteristics of the stopband may be adjusted to meet the filter's attenuation and/or width parameters as described above (e.g., based on propeller speed(s) and/or edgewise airflow).

Filter Application: The determined filter may be applied to IMU estimates of angular rates and/or accelerations. For example, the filter may reduce the magnitude of the angular rates and/or accelerations based on the magnitude of the filter at the corresponding frequency.

Flight Control 1355 may be included in Flight System 1000. For example, with reference to FIG. 10, Flight Control 1355 may include one or more of command model (e.g., 1004, 1006, 1008, and 1010), feedback (1012, 1016, 1018, and 1022), feed forward (1014, 1020), outer loop allocation (1024, 1026), inner loop control laws 1028, and/or control allocation 1029.

Movable Notch Filter 1033 may be included in System 1000, which may receive inertial estimates (e.g., accelerations, angular rates, etc.) and airspeed estimates from Vehicle Sensing 1031 and air density estimates from Air Data System 1352. In some embodiments, as shown above with reference to FIG. 10, Notch Filter 1033 may provide filtered IMU signals (e.g., filtered angular rates of the aircraft and/or filtered acceleration of the aircraft) to Inner Loop Control Laws 1028.

System 1000 may receive filtered estimates (e.g., accelerations and angular rates) from the Movable Notch Filter 1033 and may receive pilot commands from pilot inceptors 1356 (e.g., pilot input commands). Based on the received filtered estimates and the pilot commands, Flight Control 1355 may generate control commands to send to Flight Elements 1358. In some embodiments, as shown above with respect to FIG. 10, filtered estimates may be provided to Inner Loop Control Laws 1028. Inner Loop Control Laws 1028 may receive roll, pitch, and yaw commands generated by Outer Loop Allocation 1024 and 1026 reflecting an ideal aircraft response based on pilot commands received through inceptors and autopilot commands. Inner Loop Control Laws 1028 may determine moment commands based on the received roll, pitch, and yaw commands and the filtered estimates of acceleration and angular rates, reflective of how the aircraft is responding. For example, Inner Loop Control Laws 1028 may adjust moment commands based on the measured aircraft state (e.g., acceleration and angular rates) to match the commanded states.

Inner Loop Control Laws 1028 may provide (e.g., transmit) the moment commands to Control Allocation 1029. Control Allocation 1029 may receive the moment commands and determine control commands based on the received moment commands, envelop protection limits, scheduling parameters, and/or optimizer parameters. Flight Elements 1358 may be controlled according to the control commands. Therefore, System 1000 may control the Flight Elements 1358 in a manner that is not impacted by propeller vibrations.

Figure 13B:
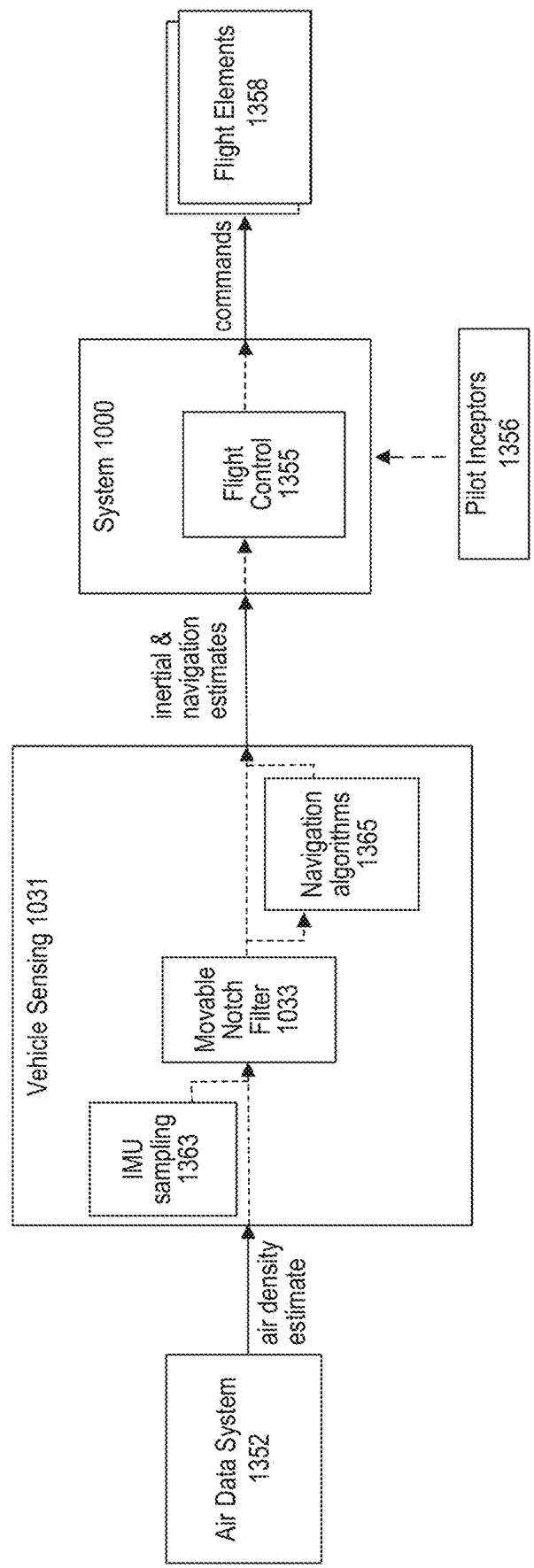
FIG. 13B illustrates another block diagram of an exemplary flight control architecture, consistent with disclosed embodiments.

FIG. 13B illustrates another block diagram of an exemplary flight control architecture, consistent with disclosed embodiments. In some embodiments, as shown in FIG. 13B, Movable Notch Filter 1033 may be included in Vehicle Sensing System 1031 (e.g., as part of an inertial navigation system) and may filter raw data provided by inertial measurement unit(s) (e.g., as represented by IMU sampling 1363) and/or corresponding sensors (e.g., accelerometer(s), 3-axis accelerometer(s), gyroscope(s), and/or 3 axis gyroscope(s)). Filtering of the raw data may be performed in the same manner as described above with reference to FIG. 13A based on determining and applying one or more filter parameters and/or stopband edges.

Navigation algorithms 1365 may incorporate the filtered data to determine position, velocity, roll rate, pitch rate, yaw rate, lateral acceleration, longitudinal acceleration, and/or vertical acceleration. As described above, System 1000 may receive the estimates (e.g., accelerations and angular rates) and pilot commands from pilot inceptors 1356 (e.g., pilot input commands). Based on the received filtered estimates and the pilot commands, Flight Control 1355 may generate control commands and send to Flight Elements 1358 to control the aircraft. Control commands may be generated in the same manner as described above with reference to FIG. 13A.

Figure 14:
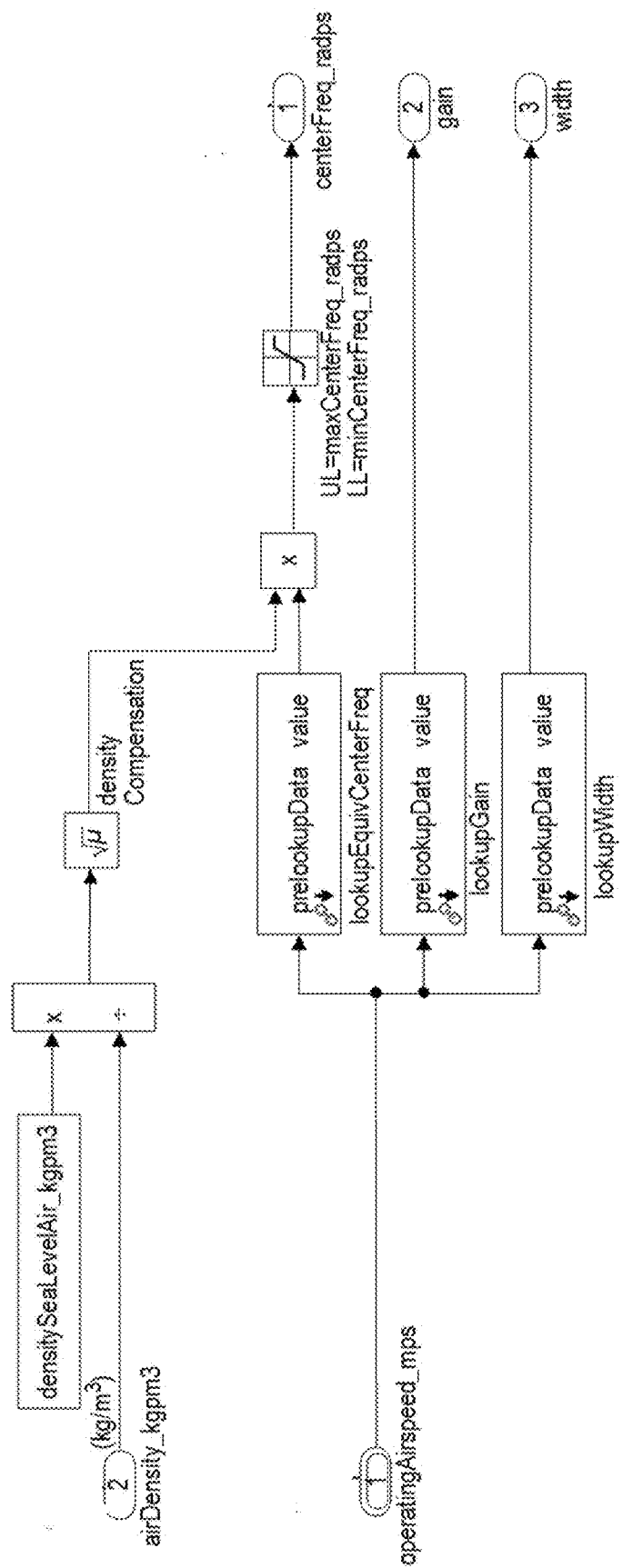
FIG. 14 illustrates the determination of filter parameters, consistent with disclosed embodiments.

FIG. 14 illustrates the determination of filter parameters, consistent with disclosed embodiments. In some embodiments, the at least one filter parameter may include at least one of a filter center of frequency, filter attenuation, or filter width. For example, as described above, Movable Notch Filter 1033 may vary one or more filter parameters (e.g., G|attenuation; ζ|width; ω_0|center frequency) according to at least one of the propeller speed or edgewise airflow. In some embodiments, one or more of these parameters may be determined using lookup tables. For example, lookup tables may be created by determining the parameters needed to effectively attenuate and/or remove the effects of vibration based on flight data (e.g., from one or more aircraft and one or more flights) and/or modeling indicative of the effects of propeller vibration across expected flight conditions (e.g., across expected airspeeds and/or propeller speeds). In some embodiments, one or more parameters may be determined based on both an airspeed (reflecting edgewise airflow) and propeller speed(s). In some embodiments, one or more parameters may be determined based on only an airspeed (e.g., parameters of width and attenuation). While lookup tables are shown in FIG. 14, filter characteristics may be stored in different manners. For example, Movable Notch Filter may store a filter model (e.g., similar to FIG. 15 below) corresponding to different airspeeds and/or propeller speeds. The filter model may be stored as a set of datapoints and/or an algorithm(s). In some embodiments, both an airspeed and tilt angle of the propeller may be used to represent edgewise airflow. For example, a magnitude of the airspeed perpendicular to the propeller axis of rotation may be used as the airspeed (e.g., in lookup tables for filter parameters).

FIG. 15 illustrates a notch filter, consistent with disclosed embodiments. As described above, the notch filter's characteristics may include width 1531, attenuation (e.g., total depth 1532 and/or edge attenuation 1534), and center frequency 1533. Further, as described above, portions of the filter may be adjusted by applying one or more stopband edges (not shown), to avoid destabilizing phase loss at lower frequencies. For example, a stopband may be applied to avoid filtering measurements at a frequency near phase loss area 1535.

Figure 16:
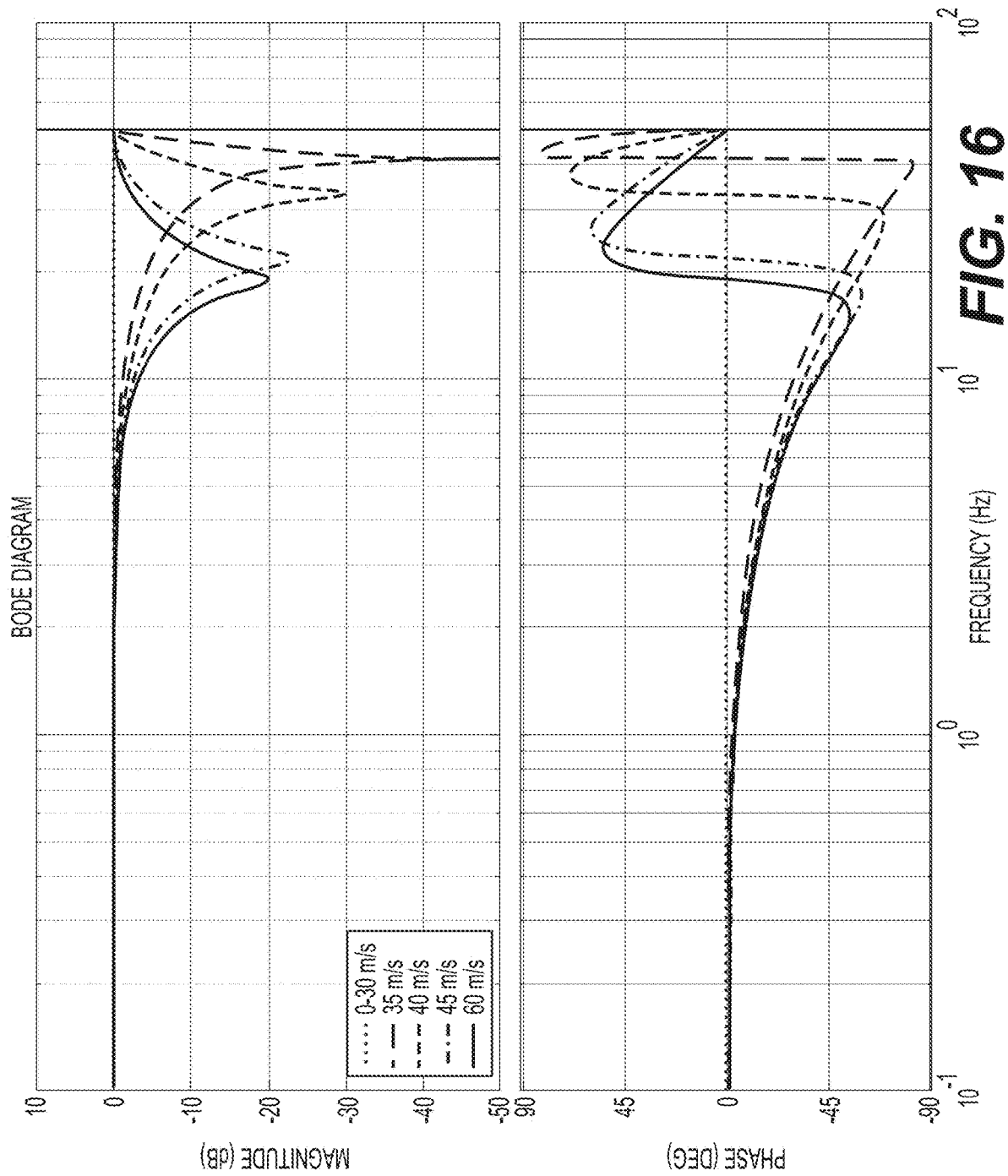
FIG. 16 illustrates notch filters at various flight phases, consistent with disclosed embodiments.

FIG. 16 illustrates a notch filter at various flight phases consistent with disclosed embodiments. As described above, the notch filter characteristics may vary with airspeed because a larger edgewise airflow may cause more vibrations in the propellers. Further, the notch filter characteristics may vary with propeller speed because a larger propeller speed may cause more vibrations in the propellers. In some embodiments, a filter may be applied to attenuate and/or remove vibrations caused by lift propellers that provide lift support during takeoff and hover (e.g., propellers 112 and 212 in FIGS. 1-2), but are eventually deenergized on a transition to forward flight. FIG. 16 shows that at low airspeed (e.g., an airspeed at or below a particular threshold or within a particular range, such as 0-30 m/s) the aircraft is hovering, and no filter is applied because the lack of edgewise airflow causes the propeller vibrations to be negligible. At intermediate airspeed (e.g., an airspeed within a predetermined range, such as 30-40 m/s), as the aircraft transitions from hover to forward flight, a filter with a larger (e.g., the largest available attenuation) may be applied because the edgewise airflow begins to impact propeller vibrations, and the propeller speed of the aircraft is still high. At higher airspeed (e.g., an airspeed at or exceeding a particular threshold, such as 40 m/s), as the aircraft transitions into fully forward flight (e.g., cruise), a filter with a smaller attenuation may be applied because the lift propellers are deenergized. As shown, in some embodiments, filter attenuation may be decreased based on airspeed indicating a hover phase of the aircraft. Further, in some embodiments, filter attenuation may be increased based on airspeed indicating a transition phase of the aircraft. Further, in some embodiments, filter attenuation may be decreased based on a decrease in propeller speed (e.g., in response to determining that the propellers are transitioning to cruise).

While FIG. 16 details one example of filters applied at different flight phases, other embodiments may include different filter characteristics based on the orientation and function of the aircraft's propellers. For example, in some embodiments, Moveable Notch Filter 1033 may be incorporated into an aircraft with propellers that provide lift support (or otherwise rotate in edgewise airflow) at later points in forward flight. Therefore, in some embodiments, filters with the largest attenuation may be applied at higher airspeeds where both edgewise airflow and propeller speed are high.

In some embodiments, Moveable Notch Filter 1033 may be incorporated into an aircraft propeller system that provides both lift and thrust support (e.g., tilt propeller system 114 in FIG. 3). Therefore, in some embodiments, a filter with the largest attenuation may be applied when the tilt propellers are at an angle to provide more lift support (and therefore experiencing more edgewise airflow) and the aircraft is at higher airspeeds.

Figure 17:
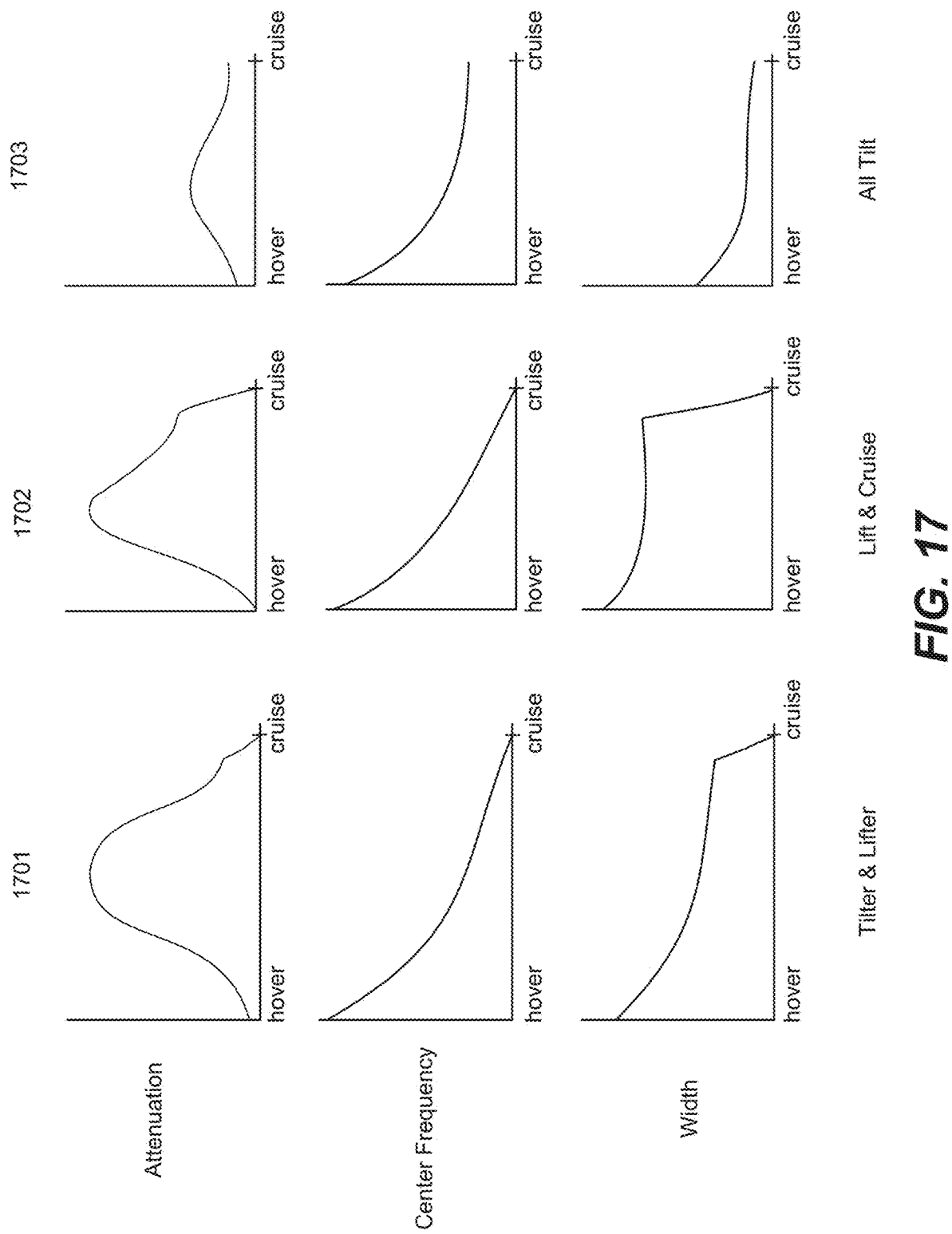
FIG. 17 illustrates changes to filter parameters based on changes to aircraft configuration.

FIG. 17 illustrates changes to filter parameters based on changes to aircraft configuration. As described above, Movable Notch Filter 1033 may store these parameters in model(s), table(s), and/or algorithm(s) to reference and appropriately filter (e.g., dynamically) aircraft state measurements (e.g., angular rate and/or acceleration measurements). Tilter and lifter configuration 1701 may refer to an aircraft that includes both tilt propellers and lift propellers. For example, tilter and lifter configuration 1701 may refer to an aircraft similar to that shown in FIG. 1-2, with a plurality of tilt propellers (114, 214) on the wings and tiltable between a lift configuration (FIG. 2), and a forward thrust configuration (FIG. 1). In some embodiments, the parameter relationships corresponding to tilter and lifter configuration 1701 may apply to a different aircraft configuration with both tilt propellers and lift propellers. Lift and cruise configuration 1702 may refer to an aircraft that uses one set of propellers for vertical lift and another set of propellers for forward thrust. All tilt configuration 1703 may refer to an aircraft where each propeller is tiltable between a lift configuration and a forward thrust configuration.

As shown, the parameters may vary based on the type of aircraft configuration. In some situations, all-tilt configuration 1703 may experience greater vibrations in hover and cruise than tilter and lifter configuration 1701 and lift and cruise configuration 1702. A larger filter attenuation value may be applied during these phases of flight for all-tilt configuration 1703 than the other configurations. However, all-tilt configuration 1703 may experience less vibration in an intermediate phase of flight. Therefore, a lower filter attenuation may be applied during this phase of flight for all-tilt configuration 1703 than the other configurations.

In some situations, all-tilt configuration 1703 may experience the effects of vibrations at a higher center of frequency in a cruise phase of flight than tilter and lifter configuration 1701 and lift and cruise configuration 1702. Therefore, the filter center of frequency may be applied at a higher frequency in a cruise phase of flight for all-tilt configuration 1703 than for the other configurations.

In some embodiments, the effects of vibrations experienced by lift and cruise configuration 1702 may spread a larger range of frequencies at a transition phase of flight than the effects of vibrations experienced by tilter and lifter configuration 1701 and all tilt configuration 1703. A wider filter may be applied for lift and cruise configuration 1702 in a transition phase than for the other configurations. Further, all tilt configuration 1703 may experience the effects of vibrations over a wider range of frequencies in a cruise phase of flight then the effects of vibrations experienced by tilter and lifter configuration 1701 and lift and cruise configuration 1702. Therefore, a wider filter may be applied for all tilt configuration 1703 at a cruise phase of flight than for the other configurations.

Figure 18:
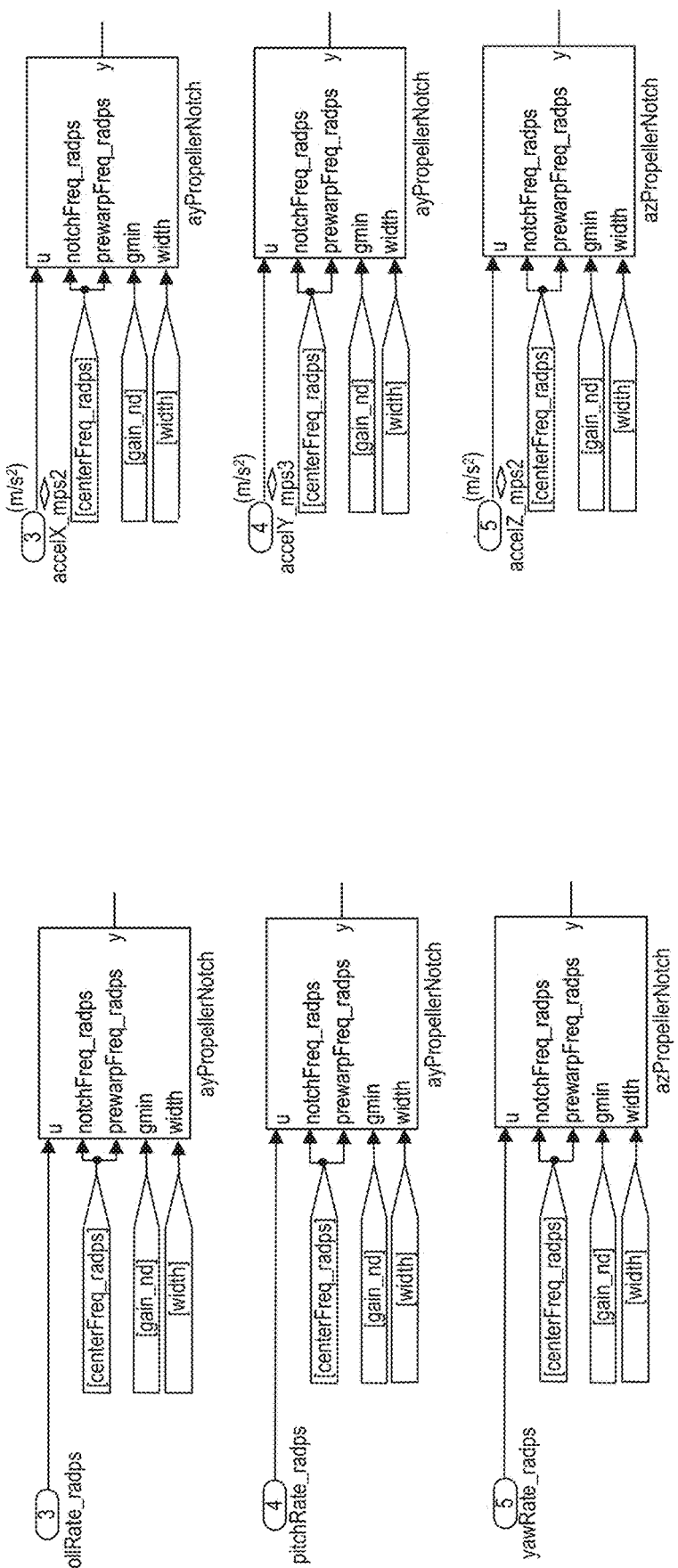
FIG. 18 illustrates the application of the filter to aircraft state estimations, consistent with disclosed embodiments.

FIG. 18 illustrates the application of the filter to aircraft state estimations, consistent with disclosed embodiments. In some embodiments, Movable Notch Filter 1033 may apply (e.g., dynamically) the filter (e.g., shown in FIG. 15 or FIG. 16) to attenuate and/or remove the effects of vibration from different aircraft state estimations. In some embodiments, Movable Notch Filter 1033 may apply the same filter to each state estimations as a percentage or 0-1 gain. For example, Movable Notch Filter 1033 may apply the same filter to a roll rate, pitch rate, yaw rate, lateral acceleration, longitudinal acceleration, and/or vertical acceleration.

In some embodiments, as described above with respect to FIG. 13B, the sensor data may be directly filtered and Vehicle Sensing 1031 may incorporate the filtered data into navigation algorithms to determine position, velocity, roll rate, pitch rate, yaw rate, lateral acceleration, longitudinal acceleration, and/or vertical acceleration.

Figure 19:
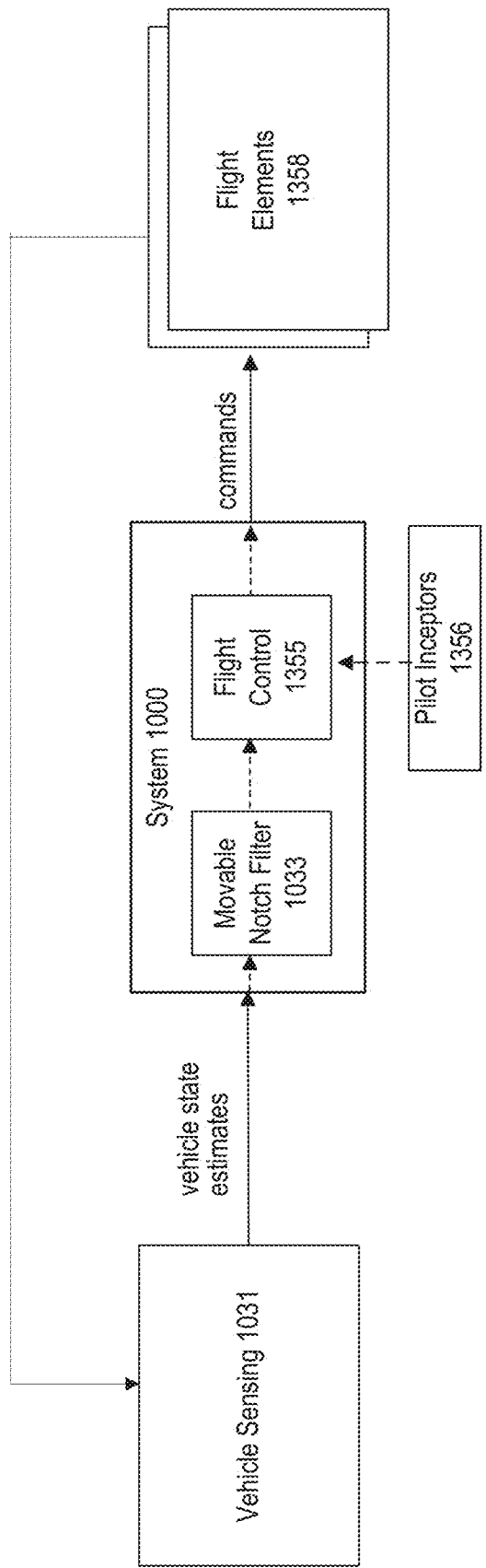
FIG. 19 illustrates another block diagram of an exemplary flight control architecture, consistent with disclosed embodiments.

FIG. 19 illustrates another block diagram of an exemplary flight control architecture, consistent with disclosed embodiments. In some embodiments, Movable Notch Filter 1033 may include an adaptive frequency domain estimator to determine one or more filter parameters. In some embodiments, Movable Notch Filter 1033 (or other system component) may analyze flight data to determine characteristics of measurements that are influenced by propeller vibrations and corresponding filter parameters that effectively attenuate and/or remove the effects of propeller vibrations. Movable Notch Filter 1033 may store combinations of filter parameters and/or rules for determining filter parameters (e.g., as algorithms, models, and/or look-up tables) and associated characteristics of measurements affected by propeller vibrations (e.g., frequency, magnitude, and/or other values of measurements effected by vibrations). Movable Notch Filter 1033 may detect measurements with characteristics showing an effect by propeller vibrations and determine and apply a combination of filter parameters to reduce the effect. In some embodiments, Movable Notch Filter 1033 may still include one or more stopbands including range(s) of frequencies where the notch filter is applied (e.g., frequencies that will be attenuated by the notch filter).

Figure 20:
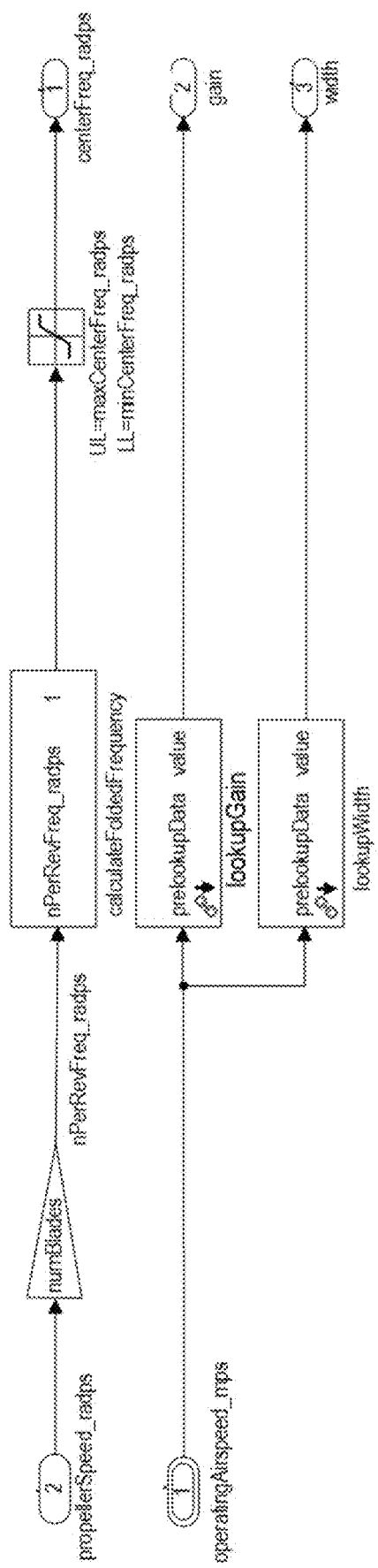
FIG. 20 illustrates another determination of filter parameters, consistent with disclosed embodiments.

FIG. 20 illustrates another determination of filter parameters, consistent with disclosed embodiments. As described above, Movable Notch Filter 1033 may vary filter parameters (e.g., G|attenuation; (|width; ω_0|center frequency), which it may do dynamically, according to the propeller speed and/or airspeed. In some embodiments, Movable Notch Filter 652 may use propeller speed measurement(s) to determine one or more filter characteristics, in lieu of approximating these measurements using air density. In some embodiments, Vehicle Sensing 1031 may include one or more propeller speed sensors to directly measure propeller speed. For example, Vehicle Sensing 1031 may include at least one magnetic sensor (e.g., hall effect or inductive sensor) or optical sensor (e.g., a tachometer). One or more of the filter parameters may be determined based on an airspeed and/or measured propeller speed(s) (e.g., using a lookup table). In some embodiments, as shown, Movable Notch Filter 1033 may determine a separate filter for each propeller speed and all filters may be applied to the state estimates (e.g., acceleration and angular rate).

In some embodiments, one or more parameters may be determined based on only an airspeed (e.g., width and attenuation). For example, flight data and/or models of an aircraft may indicate an expected propeller vibration at each airspeed. Stored parameter gains may be set to appropriately filter these vibrations. While lookup tables are shown in FIG. 20, filter information may be stored in different manners. For example, Movable Notch Filter may store a filter model (e.g., similar to FIG. 15 above) according to an airspeed and/or propeller speed. The filter model may be or include at least one of a set of datapoints, at least one algorithm, a computerized function, a program, or any digital representation of relationships between filter parameters and aircraft state information.

Figure 21:
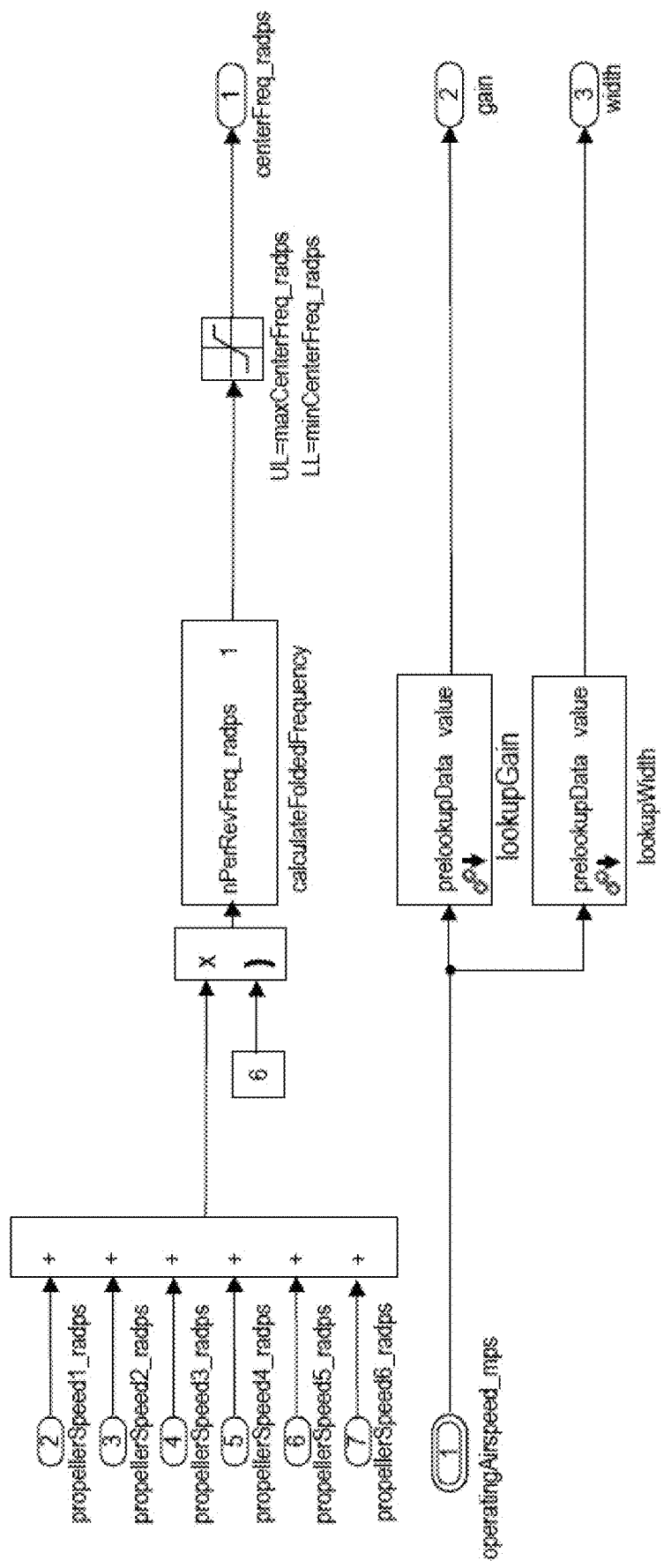
FIG. 21 illustrates another determination of filter parameters, consistent with disclosed embodiments.

FIG. 21 illustrates another determination of filter parameters, consistent with disclosed embodiments. As described above, Movable Notch Filter 1033 may vary filter parameters (e.g., G|attenuation; ζ|width; ω_0|center frequency), which it may do dynamically, according to measured propeller speeds and/or airspeed. In some embodiments, as shown, Movable Notch Filter 1033 may determine a combined filter for a group of propellers and their corresponding propeller speeds. In some embodiments, Movable Notch Filter 1033 may determine a combined filter based on the average propeller speed of one or more groups of propellers, such as determining a combined filter based on the average propeller speed of all fore propellers and a combined filter based on the average propeller speed of all aft propellers. In some embodiments, Movable Notch Filter 1033 may determine combined filters for each of: all fore propellers on a right-hand side of the aircraft, all aft propellers on a right hand side of the aircraft, all fore propellers on a left-hand side of the aircraft, and all aft propellers on a left-hand side of the aircraft. In some embodiments, Movable Notch Filter 1033 may determine combined filters for each grouping of adjacent propellers (e.g., groups of 2 or 3). In some embodiments, Movable Notch Filter 1033 may determine a combined filter based on the average speed of all aircraft propeller speeds.

In some embodiments, one or more parameters may be determined based on only an airspeed (e.g., width and attenuation). For example, flight data and/or models of an aircraft may indicate an expected propeller vibration at each airspeed. Stored parameter gains may be set to filter these vibrations. While lookup tables are shown in FIG. 21, filter information may be stored in different manners. For example, Movable Notch Filter 1033 may store a filter model (e.g., similar to FIG. 15 above) according to an airspeed and/or propeller speed. The filter model may be stored as a set of datapoints and/or an algorithm(s).

Figure 22A:
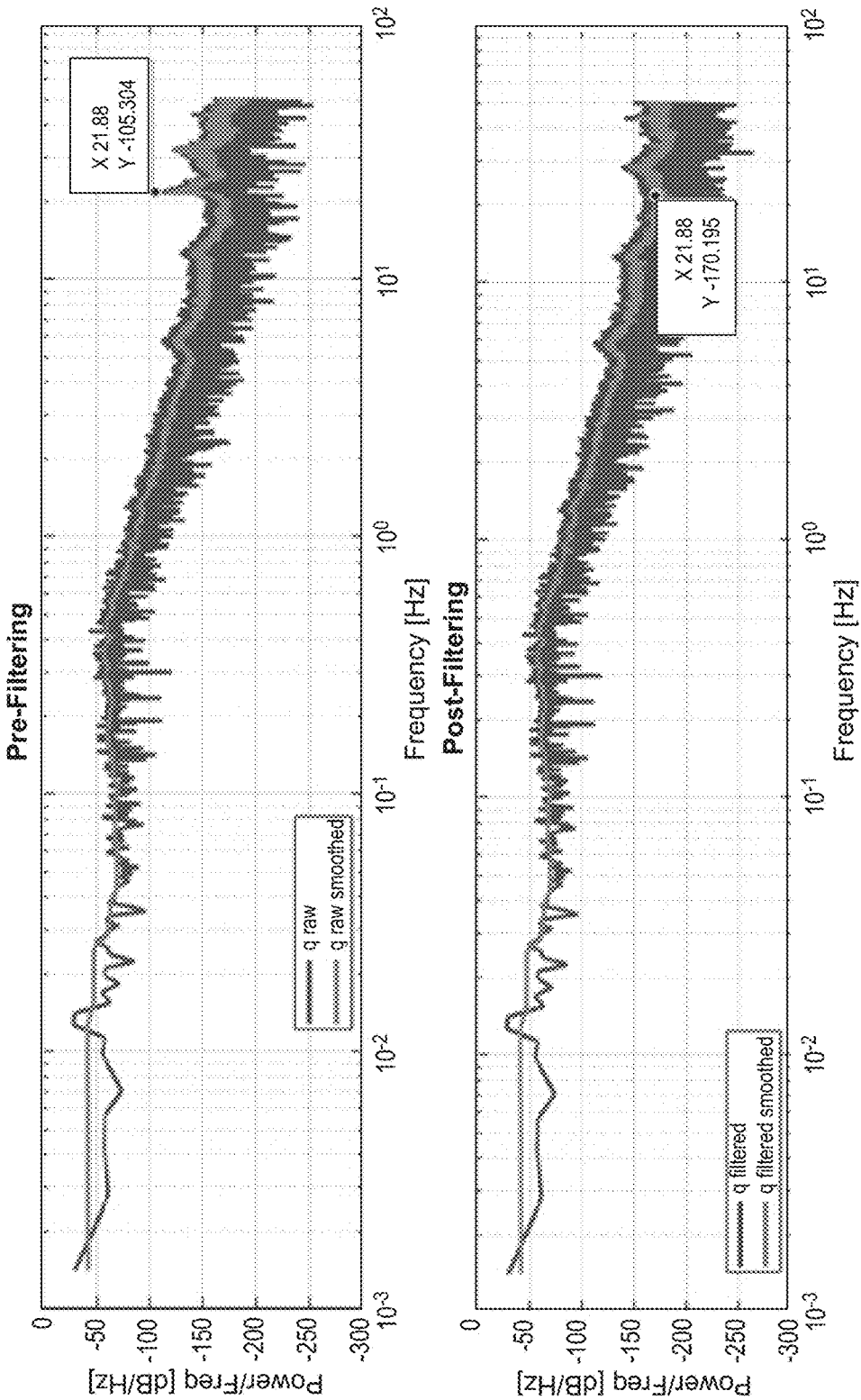
FIGS. 22A, 22B, and 22C illustrate the impact of applying the filter to aircraft state estimations and control, consistent with disclosed embodiments.
Figure 22B:
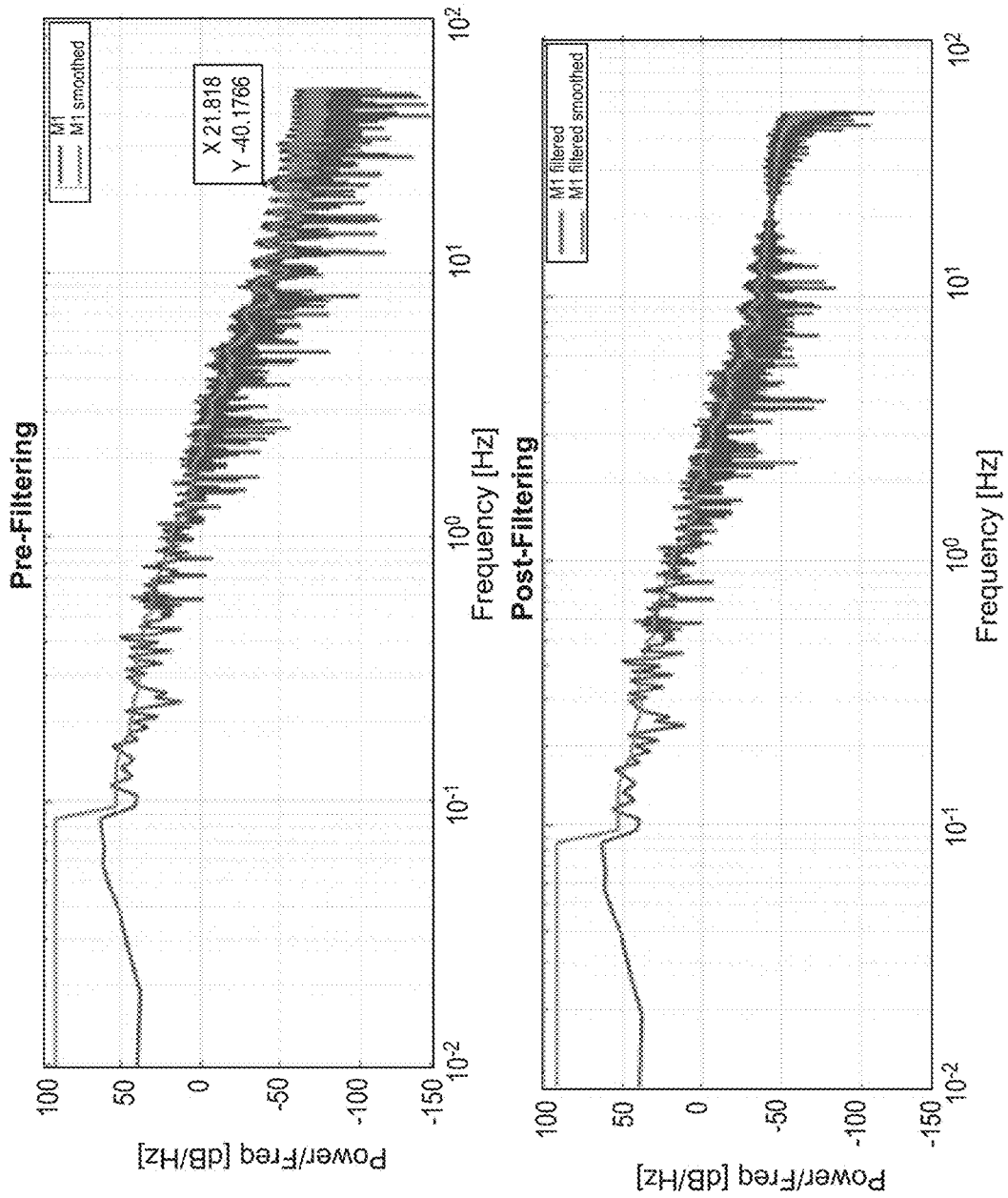
Figure 22C:
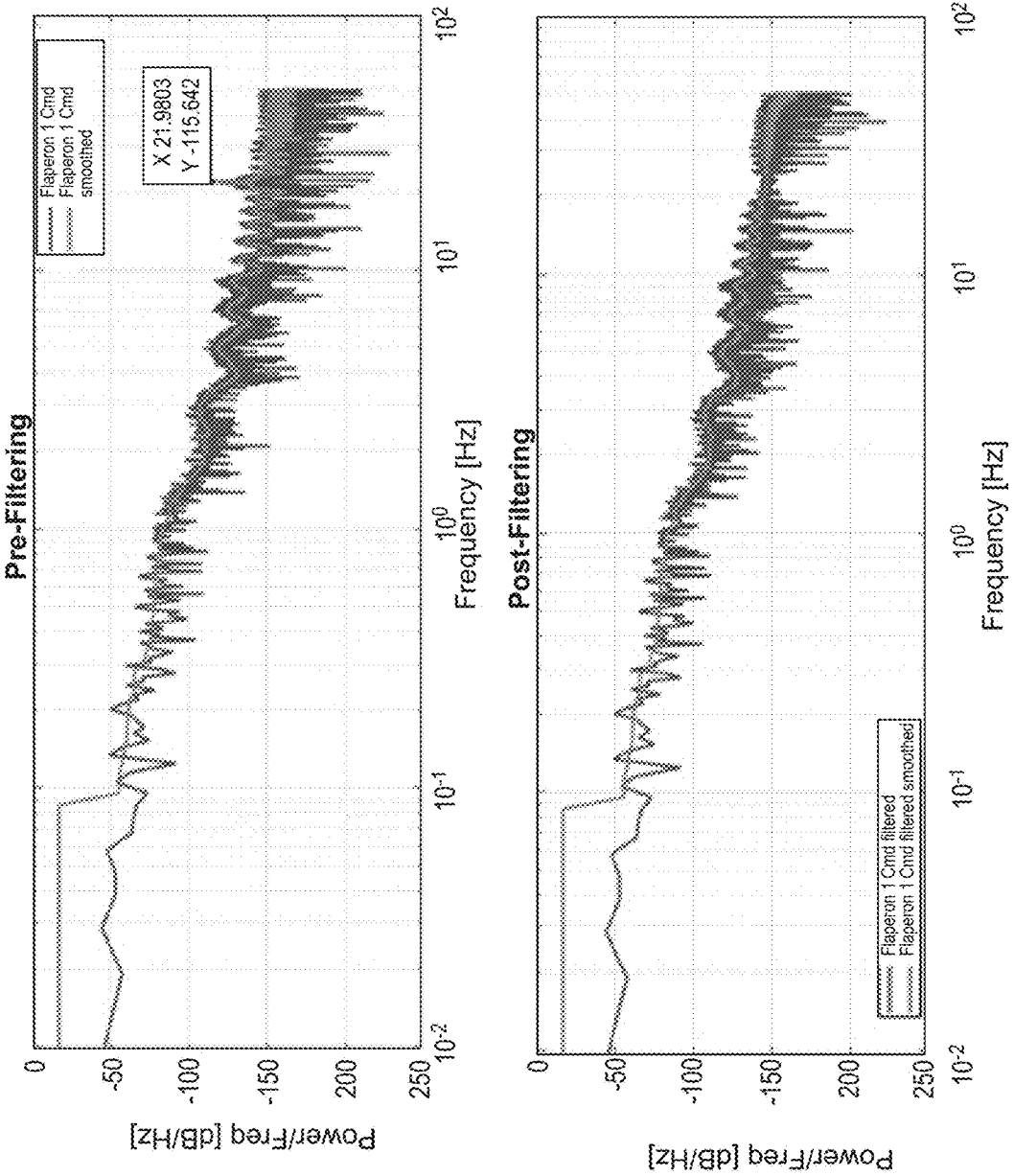

FIGS. 22A-22C illustrate the impact of applying the filter to aircraft state estimations and control, consistent with disclosed embodiments. FIG. 22A shows the impact of applying a notch filter to aircraft state measurements (e.g., angular rate measurements). FIG. 22A top figure shows measurements around 21.88 hertz are impacted by propeller vibrations, as shown by the measurement peak and large changes in estimation magnitude. FIG. 22A bottom figure shows the effect of filtering measurements using Movable Notch Filter 1033. As shown, the portion of the measurement due to propeller vibrations are attenuated and/or removed.

FIG. 22B shows how filtering the state estimations may impact control of aircraft electric engines. FIG. 22B top figure shows that when the state measurements are not filtered, propeller vibrations may cause large, high frequency, changes in electric engine command magnitudes. These high frequency commands result in increased power consumption, increased flight element temperatures (e.g., of electric engine control board and/or electric engine components), and increased wear, as described above. FIG. 22B bottom figure shows that when the state measurements are filtered, the portions of the command(s) due to propeller vibrations are attenuated and/or removed, leading to smoother control of the electric engine(s).

FIG. 22C shows how filtering the state estimations may impact control of aircraft control surfaces. FIG. 22C top figure shows that when the state measurements are not filtered, propeller vibrations may cause large, high frequency, changes in control surface command magnitudes. These high frequency commands result in increased power consumption, increased flight element temperatures (e.g., of control surface actuators), and increased wear, as described above. FIG. 22C bottom figure shows that when the state measurements are filtered, the portion of the command(s) due to propeller vibrations are attenuated and/or removed, leading to smoother control of the aircraft control surfaces.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent to those skilled in the art from consideration of the specification and practice of the implementations disclosed herein. It is intended that the architectures and circuit arrangements shown in figures are only for illustrative purposes and are not intended to be limited to the specific arrangements and circuit arrangements as described and shown in the figures. It is also intended that the specification and examples be considered as exemplary only, with the true scope and spirit of the invention being indicated by the following claims. The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the inventions disclosed herein.

CLAUSES

The embodiments may further be described using the following clauses:

1. A method for controlling an aircraft, comprising: receiving first sensor data from at least one inertial sensor of the aircraft, wherein the first sensor data is indicative of a state of the aircraft; receive second sensor data from at least one of an airspeed sensor indicating an airspeed of the aircraft or a propeller speed sensor indicating a propeller speed of at least one propeller of the aircraft; determining the state of the aircraft based on the first sensor data, wherein determining the state of the aircraft comprises filtering aircraft state measurements based on the second sensor data to lessen influence of propeller vibrations on at least one aircraft signal; and control the aircraft based on a pilot input command and the determined state of the aircraft.
2. The method of clause 1, wherein the inertial sensor comprises at least one of an accelerometer or a gyroscope.
3. The method of clause 1 or clause 2, wherein the second sensor data comprises an airspeed; wherein the at least one processor is further configured to: receive third sensor data from an air density sensor; determine a propeller speed of the aircraft based on the airspeed and the third sensor data, wherein determining the propeller speed is based on a predetermined air density and predetermined propeller speed combination corresponding to the airspeed; and wherein filtering aircraft state measurements is based on the second sensor data and the determined propeller speed.
4. The method of any of clause 1 or 2, wherein the second sensor data comprises a propeller speed; and wherein filtering the aircraft state measurements is based on the propeller speed.

5. The method of any of clauses 1-4, wherein filtering the aircraft state measurements comprises at least one of: filtering first sensor data based on the second sensor data, or filtering measurements based on the first sensor data based on the second sensor data, wherein the measurements include at least one of: acceleration of the aircraft or angular rate of the aircraft.
6. The method of any of clauses 1-5, wherein filtering aircraft state measurements comprises varying at least one filter parameter based on the second sensor data.
7. The method of clause 6, wherein the at least one filter parameter comprises at least one of a filter center frequency, filter attenuation, or filter width.
8. The method of clause 6 or 7, wherein varying at least one filter parameter based on the second sensor data comprises at least one of: decreasing filter attenuation based on the airspeed indicating a hover phase of the aircraft, increasing filter attenuation based on the airspeed indicating a transition flight phase of the aircraft, or decreasing filter attenuation based on a decrease in propeller speed.
9. The method of any of clauses 6-8, wherein varying at least one filter parameter based on the second sensor data comprises determining a filter center frequency based on a number of blades of a propeller of the aircraft and the propeller speed.
10. The method of any of clauses 6-9, wherein varying at least one filter parameter based on the second sensor data comprises determining a filter center frequency at a frequency proportional to the propeller speed.
11. The method of any of clauses 6-10, wherein varying at least one filter parameter based on the second sensor data comprises determining a filter center frequency at a frequency proportional to the number of blades.
12. The method of any of clauses 6-11, wherein varying at least one filter parameter based on the second sensor data comprises at least one of: increasing filter width based on the airspeed indicating a hover phase of the aircraft; or decreasing a filter width based on the airspeed indicating the aircraft is not in a hover phase of flight.
13. The method of any of clauses 6-12, wherein varying at least one filter parameter based on the second sensor comprises dynamically determining the filter parameter based on changes to the airspeed or the propeller speed as the aircraft is in flight.
14. The method of any of clauses 1-13, wherein filtering aircraft state measurements comprises applying a filter that includes at least one stopband edge delineating an edge of range of frequencies where the aircraft state measurements will be attenuated.
15. The method of any of clauses 1-14, wherein filtering aircraft state measurements comprises applying a filter that includes a stopband range delineating a range of frequencies where the aircraft state measurements will be attenuated.
16. The method of clause 15, wherein the stopband range is a second-order filter that adjusts filter characteristics of a first filter.
17. The method of any of clauses 1-16, further comprising receiving third sensor data indicative of a propeller angle, wherein determining the state of the aircraft comprises filtering aircraft state measurements based on the second sensor data and third sensor data to lessen the influence of propeller vibrations.
18. The method of any of clauses 1-17, wherein the second sensor data comprises a propeller speed of each propeller of a plurality of propellers on the aircraft.
19. The method of any of clauses 1-18, wherein controlling the aircraft based on the pilot input command and the determined state of the aircraft comprises: receiving a command comprising at least one of: a roll command, yaw command, or pitch command corresponding to the pilot input command; determining a moment command based on the received command and the determined aircraft state; and controlling the aircraft based on the determined moment command.
20. The method of any of clauses 1-19, wherein controlling the aircraft based on the pilot input command and the determined state of the aircraft comprises controlling at least one of: a control surface of the aircraft or an electric engine of the aircraft.
21. An electrical system, comprising at least one processor configured to perform any of clauses 1-20.
22. A computer readable storage medium storing instructions which, when executed by at least one processor, cause the at least one processor to perform the method of any one of clauses 1-20.
23. An aircraft comprising at least one processor configured to perform of any of clauses 1-20.
24. An aircraft comprising at least one processor configured to perform of any of clauses 1-20.

The invention claimed is:
1. An electrical system for an aircraft, comprising:
at least one processor configured to:
receive first sensor data from at least one inertial sensor of the aircraft, wherein the first sensor data is indicative of a state of the aircraft;
receive second sensor data from at least one of an airspeed sensor indicating an airspeed of the aircraft or a propeller speed sensor indicating a propeller speed of at least one propeller of the aircraft;
determine the state of the aircraft based on the first sensor data, wherein:
determining the state of the aircraft comprises filtering aircraft state measurements using at least one filter parameter to lessen influence of propeller vibrations on at least one aircraft signal; and
the at least one filter parameter is dynamically determined based on the second sensor data while the aircraft is in flight; and
control the aircraft based on a pilot input command and the determined state of the aircraft.
2. The electrical system of claim 1, wherein the inertial sensor comprises at least one of an accelerometer or a gyroscope.
3. The electrical system of claim 1,
wherein the second sensor data comprises an airspeed;
wherein the at least one processor is further configured to:
receive third sensor data from an air density sensor, and
determine a propeller speed of the aircraft based on the airspeed and the third sensor data;
wherein determining the propeller speed is based on a predetermined air density and predetermined propeller speed combination corresponding to the airspeed; and
wherein filtering aircraft state measurements is based on the second sensor data and the determined propeller speed.

4. The electrical system of claim 1,
wherein the second sensor data comprises a propeller speed; and
wherein filtering the aircraft state measurements is based on the propeller speed.

5. The electrical system of claim 1, wherein filtering the aircraft state measurements comprises at least one of:
filtering first sensor data based on the second sensor data, or
filtering measurements based on the first sensor data based on the second sensor data, wherein the measurements include at least one of: acceleration of the aircraft or angular rate of the aircraft.

6. The electrical system of claim 1, wherein the at least one filter parameter comprises at least one of a filter center frequency, filter attenuation, or filter width.

7. The electrical system of claim 6, wherein determining the at least one filter parameter based on the second sensor data comprises at least one of:
decreasing filter attenuation based on the airspeed indicating a hover phase of the aircraft,
increasing filter attenuation based on the airspeed indicating a transition flight phase of the aircraft, or
decreasing filter attenuation based on a decrease in propeller speed.

8. The electrical system of claim 6, wherein determining the at least one filter parameter based on the second sensor data comprises determining a filter center frequency based on a number of blades of a propeller of the aircraft and the propeller speed.

9. The electrical system of claim 6, wherein determining the at least one filter parameter based on the second sensor data comprises determining a filter center frequency at a frequency proportional to the propeller speed.

10. The electrical system of claim 6, wherein determining the at least one filter parameter based on the second sensor data comprises determining a filter center frequency at a frequency proportional to the number of blades.

11. The electrical system of claim 1, wherein determining the at least one filter parameter based on the second sensor data comprises at least one of:
increasing filter width based on the airspeed indicating a hover phase of the aircraft; or
decreasing a filter width based on the airspeed indicating the aircraft is not in a hover phase of flight.

12. The electrical system of claim 1, wherein filtering aircraft state measurements comprises applying a filter that includes at least one stopband edge delineating an edge of a range of frequencies where the aircraft state measurements will be attenuated.

13. The electrical system of claim 1, wherein filtering aircraft state measurements comprises applying a filter that includes a stopband range delineating a range of frequencies where the aircraft state measurements will be attenuated.

14. The electrical system of claim 13, wherein the stopband range is a second-order filter that adjusts filter characteristics of a first filter.

15. The electrical system of claim 1, wherein the at least one processor is further configured to receive third sensor data indicative of a propeller angle, wherein determining the state of the aircraft comprises filtering aircraft state measurements based on the second sensor data and the third sensor data to lessen the influence of propeller vibrations.

16. The electrical system of claim 1, wherein the second sensor data comprises a propeller speed of each propeller of a plurality of propellers on the aircraft.

17. The electrical system of claim 1, wherein controlling the aircraft based on the pilot input command and the determined state of the aircraft comprises:
receiving a command comprising at least one of: a roll command, yaw command, or pitch command corresponding to the pilot input command;
determining a moment command based on the received command and the determined aircraft state; and
controlling the aircraft based on the determined moment command.

18. The electrical system of claim 1, wherein controlling the aircraft based on the pilot input command and the determined state of the aircraft comprises controlling at least one of: a control surface of the aircraft or an electric engine of the aircraft.

19. An aircraft, comprising:
at least one propeller;
at least one inertial sensor;
a second sensor;
at least one processor configured to:
receive first sensor data from the at least one inertial sensor of the aircraft, wherein the first sensor data is indicative of a state of the aircraft;
receive second sensor data from the second sensor, the second sensor comprising at least one of an airspeed sensor indicating an airspeed of the aircraft or a propeller speed sensor indicating a propeller speed of the at least one propeller of the aircraft;
determine the state of the aircraft based on the first sensor data, wherein:
determining the state of the aircraft comprises filtering aircraft state measurements using at least one filter parameter to lessen influence of propeller vibrations on at least one aircraft signal; and
the at least one filter parameter is dynamically determined based on the second sensor data while the aircraft is in flight; and
control the aircraft based on a pilot input command and the determined state of the aircraft.

20. The aircraft of claim 19, wherein the inertial sensor comprises at least one of an accelerometer or a gyroscope.

21. The aircraft of claim 19,
wherein the second sensor data comprises an airspeed;
wherein the at least one processor is further configured to:
receive third sensor data from an air density sensor, and
determine a propeller speed of the aircraft based on the airspeed and the third sensor data;
wherein determining the propeller speed is based on a predetermined air density and predetermined propeller speed combination corresponding to the airspeed; and
wherein filtering aircraft state measurements is based on the second sensor data and the determined propeller speed.

22. The aircraft of claim 19,
wherein the second sensor data comprises a propeller speed; and
wherein filtering the aircraft state measurements is based on the propeller speed.

23. The aircraft of claim 19, wherein filtering the aircraft state measurements comprises at least one of:
filtering first sensor data based on the second sensor data, or
filtering measurements based on the first sensor data based on the second sensor data, wherein the measurements include at least one of: acceleration of the aircraft or angular rate of the aircraft.

24. The aircraft of claim 19, wherein the at least one filter parameter comprises at least one of a filter center frequency, filter attenuation, or filter width.

25. The aircraft of claim 24, wherein determining the at least one filter parameter based on the second sensor data comprises at least one of:
decreasing filter attenuation based on the airspeed indicating a hover phase of the aircraft,
increasing filter attenuation based on the airspeed indicating a transition flight phase of the aircraft, or
decreasing filter attenuation based on a decrease in propeller speed.

26. The aircraft of claim 24, wherein determining the at least one filter parameter based on the second sensor data comprises determining a filter center frequency based on a number of blades of a propeller of the aircraft and the propeller speed.

27. The aircraft of claim 24, wherein determining the at least one filter parameter based on the second sensor data comprises determining a filter center frequency at a frequency proportional to the propeller speed.

28. The aircraft of claim 24, wherein determining the at least one filter parameter based on the second sensor data comprises determining a filter center frequency at a frequency proportional to the number of blades.

29. The aircraft of claim 19, wherein-determining the at least one filter parameter based on the second sensor data comprises at least one of:
increasing filter width based on the airspeed indicating a hover phase of the aircraft; or
decreasing a filter width based on the airspeed indicating the aircraft is not in a hover phase of flight.

30. The aircraft of claim 19, wherein filtering aircraft state measurements comprises applying a filter that includes at least one stopband edge delineating an edge of a range of frequencies where the aircraft state measurements will be attenuated.

31. The aircraft of claim 19, wherein filtering aircraft state measurements comprises applying a filter that includes a stopband range delineating a range of frequencies where the aircraft state measurements will be attenuated.

32. The aircraft of claim 31, wherein the stopband range is a second-order filter that adjusts filter characteristics of a first filter.

33. The aircraft of claim 19, wherein the at least one processor is further configured to receive third sensor data indicative of a propeller angle, wherein determining the state of the aircraft comprises filtering aircraft state measurements based on the second sensor data and the third sensor data to lessen the influence of propeller vibrations.

34. The aircraft of claim 19, wherein the second sensor data comprises a propeller speed of each propeller of a plurality of propellers on the aircraft.

35. The aircraft of claim 19, wherein controlling the aircraft based on the pilot input command and the determined state of the aircraft comprises:
receiving a command comprising at least one of: a roll command, yaw command, or pitch command corresponding to the pilot input command;
determining a moment command based on the received command and the determined aircraft state; and
controlling the aircraft based on the determined moment command.

36. The aircraft of claim 19, wherein controlling the aircraft based on the pilot input command and the determined state of the aircraft comprises controlling at least one of: a control surface of the aircraft or an electric engine of the aircraft.

37. A method for controlling an aircraft, comprising:
receiving first sensor data from at least one inertial sensor of the aircraft, wherein the first sensor data is indicative of a state of the aircraft;
receiving second sensor data from at least one of an airspeed sensor indicating an airspeed of the aircraft or a propeller speed sensor indicating a propeller speed of at least one propeller of the aircraft;
determining the state of the aircraft based on the first sensor data, wherein:
determining the state of the aircraft comprises filtering aircraft state measurements using at least one filter parameter to lessen influence of propeller vibrations on at least one aircraft signal; and
the at least one filter parameter is dynamically determined based on the second sensor data while the aircraft is in flight; and
controlling the aircraft based on a pilot input command and the determined state of the aircraft.

38. The method of claim 37, wherein the inertial sensor comprises at least one of an accelerometer or a gyroscope.

39. The method of claim 37,
wherein the second sensor data comprises an airspeed;
wherein the to the method further comprises:
receiving third sensor data from an air density sensor, and
determine a propeller speed of the aircraft based on the airspeed and the third sensor data;
wherein determining the propeller speed is based on a predetermined air density and predetermined propeller speed combination corresponding to the airspeed; and
wherein filtering aircraft state measurements is based on the second sensor data and the determined propeller speed.

40. The method of claim 37,
wherein the second sensor data comprises a propeller speed; and
wherein filtering the aircraft state measurements is based on the propeller speed.

41. The method of claim 37, wherein filtering the aircraft state measurements comprises at least one of:
filtering first sensor data based on the second sensor data, or
filtering measurements based on the first sensor data based on the second sensor data, wherein the measurements include at least one of: acceleration of the aircraft or angular rate of the aircraft.

42. The method of claim 37, wherein the at least one filter parameter comprises at least one of a filter center frequency, filter attenuation, or filter width.

43. The method of claim 42, wherein determining the at least one filter parameter based on the second sensor data comprises at least one of:
decreasing filter attenuation based on the airspeed indicating a hover phase of the aircraft,
increasing filter attenuation based on the airspeed indicating a transition flight phase of the aircraft, or
decreasing filter attenuation based on a decrease in propeller speed.

44. The method of claim 42, wherein determining the at least one filter parameter based on the second sensor data comprises determining a filter center frequency based on a number of blades of a propeller of the aircraft and the propeller speed.

45. The method of claim 42, wherein determining the at least one filter parameter based on the second sensor data comprises determining a filter center frequency at a frequency proportional to the propeller speed.

46. The method of claim 42, wherein determining the at least one filter parameter based on the second sensor data comprises determining a filter center frequency at a frequency proportional to the number of blades.

47. The method of claim 37, wherein-determining the at least one filter parameter based on the second sensor data comprises at least one of:
increasing filter width based on the airspeed indicating a hover phase of the aircraft; or
decreasing a filter width based on the airspeed indicating the aircraft is not in a hover phase of flight.

48. The method of claim 37, wherein filtering aircraft state measurements comprises applying a filter that includes at least one stopband edge delineating an edge of a range of frequencies where the aircraft state measurements will be attenuated.

49. The method of claim 37, wherein filtering aircraft state measurements comprises applying a filter that includes a stopband range delineating a range of frequencies where the aircraft state measurements will be attenuated.

50. The aircraft of claim 49, wherein the stopband range is a second-order filter that adjusts filter characteristics of a first filter.

51. The method of claim 37, wherein the at least one processor is further configured to receive third sensor data indicative of a propeller angle, wherein determining the state of the aircraft comprises filtering aircraft state measurements based on the second sensor data and the third sensor data to lessen the influence of propeller vibrations.

52. The method of claim 37, wherein the second sensor data comprises a propeller speed of each propeller of a plurality of propellers on the aircraft.

53. The method of claim 37, wherein controlling the aircraft based on the pilot input command and the determined state of the aircraft comprises:
receiving a command comprising at least one of: a roll command, yaw command, or pitch command corresponding to the pilot input command;
determining a moment command based on the received command and the determined aircraft state; and
controlling the aircraft based on the determined moment command.

54. The method of claim 37, wherein controlling the aircraft based on the pilot input command and the determined state of the aircraft comprises controlling at least one of: a control surface of the aircraft or an electric engine of the aircraft.

55. A non-transitory computer readable storage medium storing instructions which, when executed by at least one processor, cause the at least one processor to:
receive first sensor data from at least one inertial sensor of an aircraft, wherein the first sensor data is indicative of a state of the aircraft;
receive second sensor data from at least one of an airspeed sensor indicating an airspeed of the aircraft or a propeller speed sensor indicating a propeller speed of at least one propeller of the aircraft;
determine the state of the aircraft based on the first sensor data, wherein:
determining the state of the aircraft comprises filtering aircraft state measurements at least one filter parameter to lessen influence of propeller vibrations on at least one aircraft signal; and
the at least one filter parameter is dynamically determined based on the second sensor data while the aircraft is in flight; and
control the aircraft based on a pilot input command and the determined state of the aircraft.

56. The computer readable storage medium of claim 55, wherein the inertial sensor comprises at least one of an accelerometer or a gyroscope.

57. The computer readable storage medium of claim 55, wherein the second sensor data comprises an airspeed;
wherein the at least one processor is further configured to:
receive third sensor data from an air density sensor, and
determine a propeller speed of the aircraft based on the airspeed and the third sensor data;
wherein determining the propeller speed is based on a predetermined air density and predetermined propeller speed combination corresponding to the airspeed; and
wherein filtering aircraft state measurements is based on the second sensor data and the determined propeller speed.

58. The computer readable storage medium of claim 55, wherein the second sensor data comprises a propeller speed; and
wherein filtering the aircraft state measurements is based on the propeller speed.

59. The computer readable storage medium of claim 55, wherein filtering the aircraft state measurements comprises at least one of:
filtering first sensor data based on the second sensor data, or
filtering measurements based on the first sensor data based on the second sensor data, wherein the measurements include at least one of: acceleration of the aircraft or angular rate of the aircraft.

60. The computer readable storage medium of claim 55, wherein the at least one filter parameter comprises at least one of a filter center frequency, filter attenuation, or filter width.

61. The computer readable storage medium of claim 60, wherein determining the at least one filter parameter based on the second sensor data comprises at least one of:
decreasing filter attenuation based on the airspeed indicating a hover phase of the aircraft,
increasing filter attenuation based on the airspeed indicating a transition flight phase of the aircraft, or
decreasing filter attenuation based on a decrease in propeller speed.

62. The computer readable storage medium of claim 60, wherein determining the at least one filter parameter based on the second sensor data comprises determining a filter center frequency based on a number of blades of a propeller of the aircraft and the propeller speed.

63. The computer readable storage medium of claim 60, wherein determining the at least one filter parameter based on the second sensor data comprises determining a filter center frequency at a frequency proportional to the propeller speed.

64. The computer readable storage medium of claim 60, wherein determining the at least one filter parameter based on the second sensor data comprises determining a filter center frequency at a frequency proportional to the number of blades.

65. The computer readable storage medium of claim 55, wherein-determining the at least one filter parameter based on the second sensor data comprises at least one of:
increasing filter width based on the airspeed indicating a hover phase of the aircraft; or decreasing a filter width based on the airspeed indicating the aircraft is not in a hover phase of flight.

66. The computer readable storage medium of claim 55, wherein filtering aircraft state measurements comprises applying a filter that includes at least one stopband edge delineating an edge of a range of frequencies where the aircraft state measurements will be attenuated.

67. The computer readable storage medium of claim 55, wherein filtering aircraft state measurements comprises applying a filter that includes a stopband range delineating a range of frequencies where the aircraft state measurements will be attenuated.

68. The aircraft of claim 67, wherein the stopband range is a second-order filter that adjusts filter characteristics of a first filter.

69. The computer readable storage medium of claim 55, wherein the at least one processor is further configured to receive third sensor data indicative of a propeller angle, wherein determining the state of the aircraft comprises filtering aircraft state measurements based on the second sensor data and the third sensor data to lessen the influence of propeller vibrations.

70. The computer readable storage medium of claim 55, wherein the second sensor data comprises a propeller speed of each propeller of a plurality of propellers on the aircraft.

71. The computer readable storage medium of claim 55, wherein controlling the aircraft based on the pilot input command and the determined state of the aircraft comprises:

receiving a command comprising at least one of: a roll command, yaw command, or pitch command corresponding to the pilot input command;

determining a moment command based on the received command and the determined aircraft state; and controlling the aircraft based on the determined moment command.

72. The computer readable storage medium of claim 55, wherein controlling the aircraft based on the pilot input command and the determined state of the aircraft comprises controlling at least one of: a control surface of the aircraft or an electric engine of the aircraft.

* * * * *